(12) United States Patent
Moyers

(10) Patent No.: US 9,602,447 B2
(45) Date of Patent: *Mar. 21, 2017

(54) CONTEXT BASED VIRTUAL AREA CREATION

(71) Applicant: Social Communications Company, Eugene, OR (US)

(72) Inventor: Josh Moyers, Okland, CA (US)

(73) Assignee: Sococo, Inc., Eugene, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/070,551

(22) Filed: Mar. 15, 2016

(65) Prior Publication Data

US 2016/0197862 A1    Jul. 7, 2016

Related U.S. Application Data

(63) Continuation of application No. 13/954,742, filed on Jul. 30, 2013, now Pat. No. 9,319,357.

(60) Provisional application No. 61/682,218, filed on Aug. 11, 2012.

(51) Int. Cl.
*H04L 12/58* (2006.01)
*H04L 12/18* (2006.01)

(52) U.S. Cl.
CPC .......... *H04L 51/04* (2013.01); *H04L 12/1822* (2013.01); *H04L 12/1827* (2013.01); *H04L 51/063* (2013.01); *H04L 51/10* (2013.01); *H04L 51/18* (2013.01)

(58) Field of Classification Search
CPC ......... H04L 51/04; H04L 51/10; H04L 51/18; H04L 12/1827; H04L 51/063; H04L 12/1822; G06F 3/00; G06F 15/16; G06F 17/00
See application file for complete search history.

(56) References Cited

U.S. PATENT DOCUMENTS

| | | | |
|---|---|---|---|
| 9,319,357 B2 * | 4/2016 | Moyers | H04L 51/04 |
| 2003/0154250 A1 | 8/2003 | Miyashita | |
| 2004/0260770 A1 | 12/2004 | Medlin et al. | |
| 2005/0021618 A1 | 1/2005 | Isozaki | |
| 2010/0146118 A1 * | 6/2010 | Wie | H04L 67/306 709/225 |
| 2015/0312285 A1 | 10/2015 | Moyers et al. | |

* cited by examiner

*Primary Examiner* — Kim T Nguyen
(74) *Attorney, Agent, or Firm* — Law Office of Edouard Garcia

(57) ABSTRACT

Examples of systems and methods for context based virtual area creation are described. Some examples provide a quick and easy way for users to wrap virtual areas around contexts of interest. Examples of such contexts may be defined in terms of one or more of content, people, and real-world location. The virtual areas support realtime communications between communicants (e.g., one or more of text chat, voice, video, application sharing, and file sharing) and provide a persistent historical repository for interactions in the virtual area. Summaries of activities and other events in virtual areas typically are published in realtime so that other communicants can readily obtain a quick summary of the activities occurring in a particular context and decide whether or not to join or otherwise participate in those activities.

20 Claims, 23 Drawing Sheets

CONTEXT BASED VIRTUAL AREA CREATION

CROSS-REFERENCE TO RELATED APPLICATIONS

This application is a continuation of prior U.S. patent application Ser. No. 13/954,742, filed Jul. 30, 2013, which claims the benefit of U.S. Provisional Application No. 61/682,218, filed Aug. 11, 2012, the entirety of which is incorporated herein by reference.

This application relates to the following co-pending patent applications, the entirety of each of which is incorporated herein by reference:
- U.S. application Ser. No. 12/818,517, filed Jun. 18, 2010;
- U.S. application Ser. No. 12/855,210, filed Aug. 12, 2010;
- U.S. application Ser. No. 12/630,973, filed Dec. 4, 2009;
- U.S. application Ser. No. 12/418,243, filed Apr. 3, 2009;
- U.S. application Ser. No. 12/354,709, filed Jan. 15, 2009;
- U.S. application Ser. No. 12/825,512, filed Jun. 29, 2010;
- U.S. application Ser. No. 12/630,973, filed Dec. 4, 2009;
- U.S. application Ser. No. 12/509,658, filed Jul. 27, 2009;
- U.S. application Ser. No. 13/165,729, filed Jun. 21, 2011;
- U.S. application Ser. No. 13/209,812, filed Aug. 15, 2011;
- U.S. application Ser. No. 13/209,812, filed Aug. 15, 2011;
- U.S. application Ser. No. 13/399,737, filed Feb. 17, 2012;
- U.S. application Ser. No. 13/432,837, filed Mar. 28, 2012;
- U.S. application Ser. No. 13/554,051, filed Jul. 20, 2012;
- U.S. application Ser. No. 13/554,084, filed Jul. 20, 2012;
- U.S. Provisional Application No. 61/563,088, filed Nov. 23, 2011;
- U.S. Provisional Application No. 61/535,910, filed Sep. 16, 2011;
- U.S. Provisional Application No. 61/597,757, filed Feb. 11, 2012; and
- U.S. Provisional Application No. 61/603,024, filed Feb. 24, 2012.

BACKGROUND

When face-to-face communications are not practical, people often rely on one or more technological solutions to meet their communications needs. Traditional telephony systems enable voice communications between callers. Instant messaging (also referred to as "chat") communications systems enable users to communicate text messages in real time through instant message computer clients that are interconnected by an instant message server. Some instant messaging systems and interactive virtual reality communications systems allow users to be represented by user-controllable graphical objects (referred to as "avatars"). What are needed are improved systems and methods for realtime network communications.

DETAILED DESCRIPTION

Figure 1:
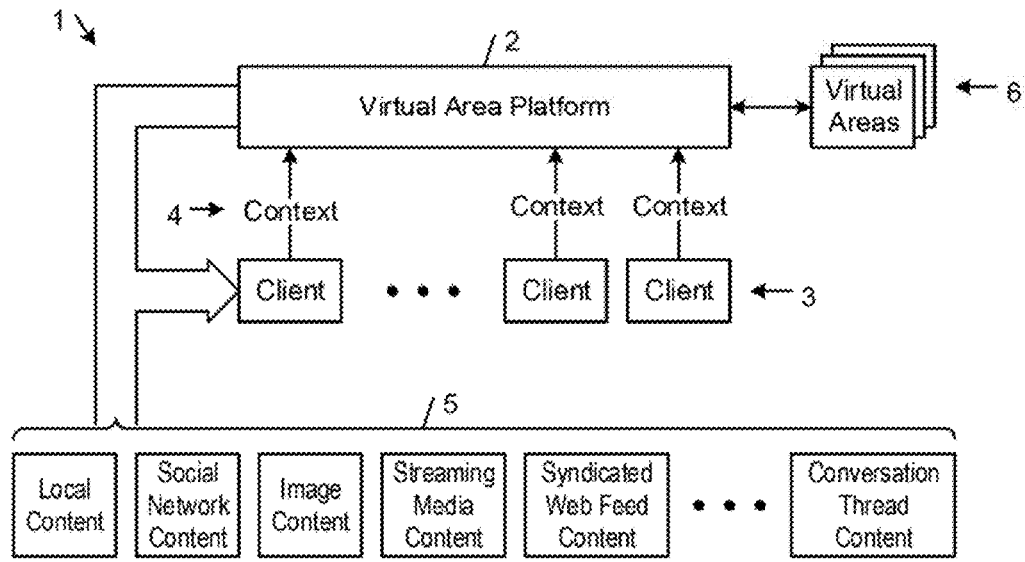
FIG. 1 is a diagrammatic view of an example of a network communications environment.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Definition of Terms

A "communicant" is a person who communicates or otherwise interacts with other persons over one or more network connections, where the communication or interaction may or may not occur in the context of a virtual area. A "user" is a communicant who is operating a particular network node that defines a particular perspective for descriptive purposes.

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "data file" is a block of information that durably stores data for use by a software application.

The term "computer-readable medium" refers to any tangible, non-transitory medium capable storing information (e.g., instructions and data) that is readable by a machine (e.g., a computer). Storage devices suitable for tangibly embodying such information include, but are not limited to, all forms of physical, non-transitory computer-readable memory, including, for example, semiconductor memory devices, such as random access memory (RAM), EPROM, EEPROM, and Flash memory devices, magnetic disks such as internal hard disks and removable hard disks, magneto-optical disks, DVD-ROM/RAM, and CD-ROM/RAM.

A "data sink" (referred to herein simply as a "sink") is any of a device (e.g., a computer), part of a device, or software that receives data.

A "data source" (referred to herein simply as a "source") is any of a device (e.g., a computer), part of a device, or software that originates data.

A "network node" (also referred to simply as a "node") is a junction or connection point in a communications network. Examples of network nodes include, but are not limited to, a terminal, a computer, and a network switch. A "server" network node is a host computer on a network that responds to requests for information or service. A "client network node" is a computer on a network that requests information or service from a server.

A Uniform Resource Identifier (URI) is a string of characters that identifies a network resource.

A "network resource" is anything that can be identified by a uniform resource identifier (URI) and accessed over a network, including an electronic document, an image, a source of information, a service, operators and operands of a mathematical equation, classes, properties, numeric values, and a collection of other resources.

A "network connection" is a link between two communicating network nodes. A "connection handle" is a pointer or identifier (e.g., a uniform resource identifier (URI)) that can be used to establish a network connection with a network resource. A "network communication" can include any type of information (e.g., text, voice, audio, video, electronic mail message, data file, motion data stream, and data packet) that is transmitted or otherwise conveyed from one network node to another network node over a network connection.

A "communicant interaction" is any type of direct or indirect action or influence between a communicant and another network entity, which may include for example another communicant, a virtual area, or a network service. Examples of types of communicant interactions include communicants communicating with each other in realtime, a communicant entering a virtual area, and a communicant requesting access to a resource from a network service.

"Presence" refers to the ability and willingness of a networked entity (e.g., a communicant, service, or device) to communicate, where such willingness affects the ability to detect and obtain information about the state of the entity on a network and the ability to connect to the entity.

A "realtime data stream" is data that is structured and processed in a continuous flow and is designed to be received with no delay or only imperceptible delay. Realtime data streams include digital representations of voice, video, user movements, facial expressions and other physical phenomena, as well as data within the computing environment that may benefit from rapid transmission, rapid execution, or both rapid transmission and rapid execution, including for example, avatar movement instructions, text chat, realtime data feeds (e.g., sensor data, machine control instructions, transaction streams and stock quote information feeds), screen shares, and file transfers.

A "virtual area" (also referred to as an "area," a "place," or a "space") is a representation of a computer-managed space or scene. Virtual areas typically are one-dimensional, two-dimensional, or three-dimensional representations; although in some examples a virtual area may correspond to a single point. Oftentimes, a virtual area is designed to simulate a physical, real-world space. For example, using a traditional computer monitor, a virtual area may be visualized as a two-dimensional graphic of a three-dimensional computer-generated space. However, virtual areas do not require an associated visualization. A virtual area typically refers to an instance of a virtual area schema, where the schema defines the structure and contents of a virtual area in terms of variables and the instance defines the structure and contents of a virtual area in terms of values that have been resolved from a particular context.

A "position" in a virtual area refers to a location of a point or an area or a volume in the virtual area. A point typically is represented by a single set of one-dimensional, two-dimensional, or three-dimensional coordinates (e.g., x, y, z) that define a spot in the virtual area. An area typically is represented by the three-dimensional coordinates of three or more coplanar vertices that define a boundary of a closed two-dimensional shape in the virtual area. A volume typically is represented by the three-dimensional coordinates of four or more non-coplanar vertices that define a closed boundary of a three-dimensional shape in the virtual area.

A "summary of an area" is a view on data associated with a virtual area. In some examples, a summary of a virtual area refers to a view on the data associated with the respective area object generated for that virtual area.

An "assembly" is a gathering of two or more copresent communicants in a virtual area location that defines a context for realtime communications between the copresent communicants.

A "predicate" is a conditional part of a rule. A predicate typically conditions a result or action (e.g., the creation of a virtual area) on satisfaction of one or more criteria.

A "request" is a communication for a network node or service to perform a function. A request may be made in a single data transmission or in a collection of related data transmissions.

As used herein, the term "includes" means includes but not limited to, the term "including" means including but not limited to. The term "based on" means based at least in part on.

II. Context Based Virtual Area Creation

The examples that are described herein provide systems and methods for context based virtual area creation. Some examples provide a quick and easy way for users to wrap virtual areas around contexts of interest, which may be defined, for example, in terms of one or more of content, people, and real-world location. The virtual areas support realtime communications between communicants (e.g., text chat, voice, video, application sharing, and file sharing) and provide a persistent historical repository for interactions in the virtual area. Summaries of activities and other events in virtual areas typically are published in realtime so that other communicants can readily obtain a quick summary of the activities occurring in a particular context and decide whether or not to join or otherwise participate in those activities. The area activity summaries may be published to all communicants, only those communicants who are socially related to (e.g., friends or friends-of-friends of) the activity participants or the members of the virtual area, or only members of the virtual area. Similarly, access to a virtual area may be restricted to particular communicants (e.g., members of the virtual area), open to communicants who are socially related to (e.g., friends or friends-of-friends) the members of the virtual area or the participants engaged in published activities in the virtual area, or open to all users. In some examples, communicants can "lurk" and view the realtime activities of communicants in a virtual area before entering the virtual area so that they can quickly browse various realtime contexts of potential interest without changing their current presence state.

FIG. 1 shows an embodiment of a network communications environment 1 that includes a virtual area platform 2, and client network nodes 3. Users of the client network nodes 3 may define contexts 4 in terms of data from one or more of the virtual area platform 2, the client network nodes 3 themselves, and other data sources 5. The contexts 4 also may be defined by the virtual area platform 2 and third-party entities.

The contexts 4 may be defined, for example, in terms of one or more of content, people, and real-world location. Content items include local content (e.g., documents, images, video files, and audio files) stored on the client network nodes 3, social network content (e.g., activity feeds), image content (e.g., photographs), streaming media content (e.g., streaming audio, streaming video), syndicated web feed content (e.g., webpages, blogs, and podcasts), and conversation thread content (e.g., wiki boards, micro-blogs such as Twitter® feeds, emails, bulletin boards, newsgroups, internet forum threads, comment threads). People based contexts include data relating to users' contacts received from the virtual area platform 2, social network services, and other communication services (e.g., instant messaging services, email hosting services, and internet forum services). Location based contexts include real-world locations of mobile apparatus (e.g., mobile phones and vehicles) and real-world locations of stationary apparatus (e.g., network equipment) and structures (e.g., buildings).

Figures 2A, 2B, 2C:
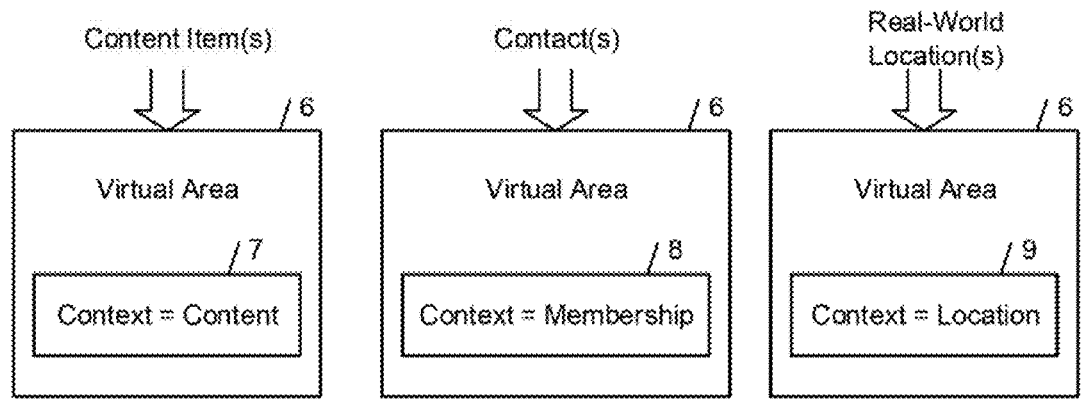
FIGS. 2A-2C are diagrammatic views of examples of virtual areas wrapped around different respective contents.

The virtual area platform 2 creates virtual areas 6 based on the contexts 4. In the examples shown in FIGS. 2A-2C, the contexts 7, 8, and 9 are defined by one or more content items, one or more contacts, and one or more real-world locations, respectively. The virtual area platform 2 wraps respective virtual areas around the contexts 7, 8, and 9 by creating area objects that respectively represent the virtual areas, and associating the area objects with the respective contexts 7, 8, and 9 and information relating to the context-defining entity (e.g., a communicant or third party entity).

Figure 3:
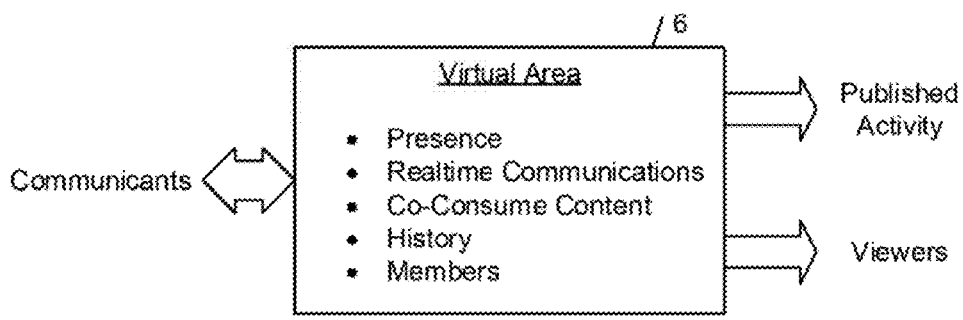
FIG. 3 is a diagrammatic view of examples of information flows relating to a virtual area.

The virtual area platform 2 administers the virtual areas 6. In the example, shown in FIG. 3, the virtual area platform 2 administers communicant presence in virtual area, realtime communications between communicants who are co-present in the virtual area, co-consumption of content (e.g., images, streaming audio, streaming video, and synchronous application sharing content) by co-present communicants, interaction history (e.g., text chat and event logs) in the virtual area, and membership of the virtual area. These additional data and realtime interaction activity data augment and modify the original contexts 4 around which the virtual areas 6 were created.

The virtual area platform 2 also handles publication of realtime area activity feeds describing realtime interactions in the virtual area, and manages access to the virtual area by viewers and potential entrants into the virtual area.

The virtual area platform 2 and the client network nodes 3 may be implemented in a variety of different ways.

Figure 4:
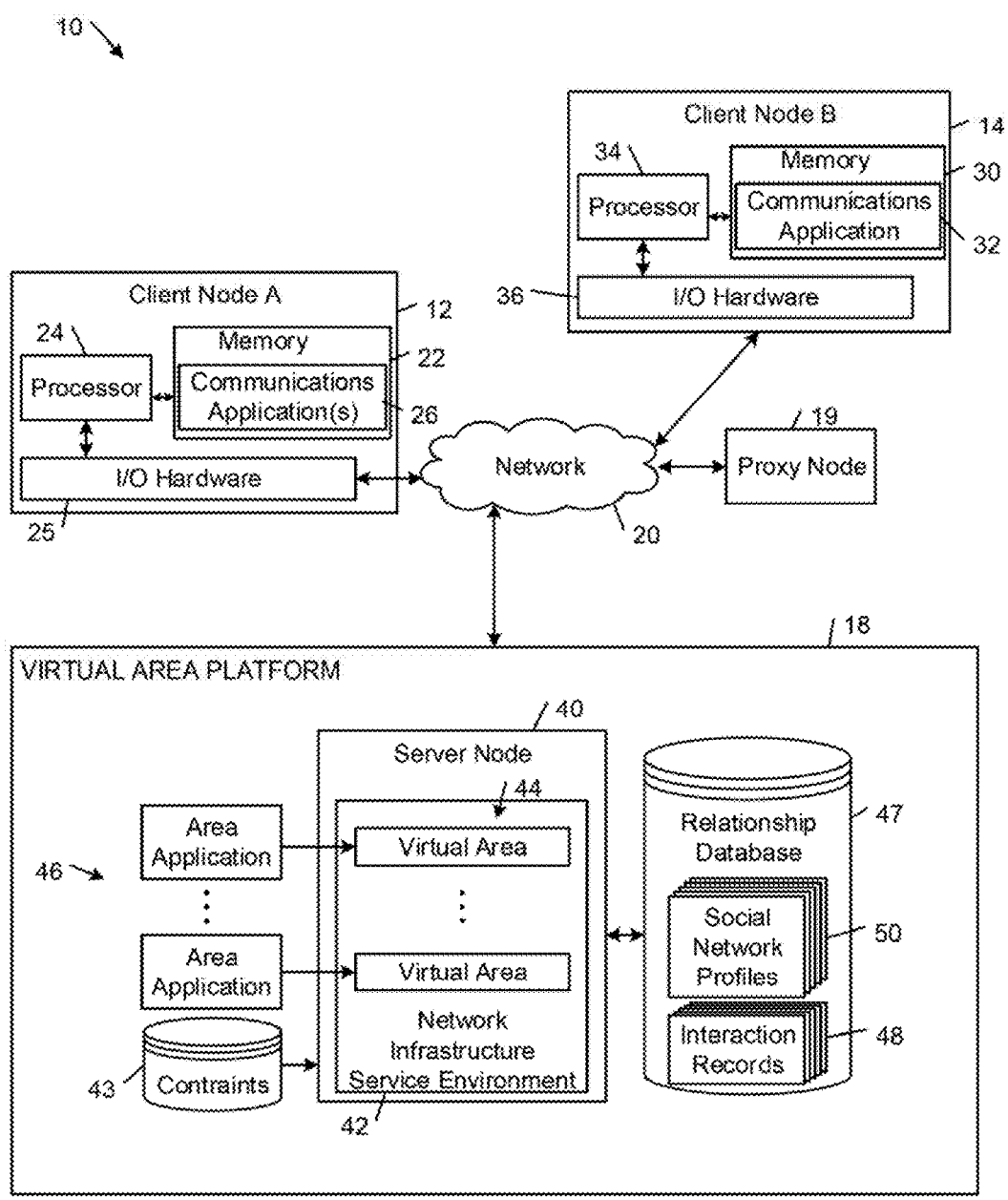
FIG. 4 is a diagrammatic view of an example of a network communications environment.

FIG. 4 shows an example 10 of the network communications environment 1 that includes an example of a first client network node 12 (Client Node A), an example of a second client network node 14 (Client Network Node B), an example 18 of the virtual area platform 2, and an optional proxy network node 19 that are interconnected by a network 20. The network 20 may include one or more of a local area network (LAN), a metropolitan area network (MAN), and a wide area network (WAN) (e.g., the internet). The network 20 typically includes a number of different computing platforms and transport facilities that support the transmission of a wide variety of different media types (e.g., text, voice, audio, video, and other data) between network nodes.

The first client network node 12 includes a computer-readable medium 22 (or "memory"), a processor 24, and input/output (I/O) hardware 25 (including, e.g., a display and network communication hardware). The processor 24 executes at least one virtual area communications application 26 that is stored in the memory 22. The second client network node 14 typically is configured in substantially the same general way as the first client network node 12, with a computer-readable medium 30 storing at least one virtual area communications application 32, a processor 34, and I/O hardware 36.

Each of the network nodes 12, 14 has a respective set of one or more sources and an exemplary set of one or more sinks. Each source is a device or component that originates data of a particular data stream content type and each sink is a device or component that receives data of a particular data stream content type. A source and a sink of the same data stream content type are referred to herein as being "complementary." Exemplary sources include an audio source (e.g., an audio capture device, such as a microphone), a video source (e.g., a video capture device, such as a video camera), a chat source (e.g., a text capture device, such as a keyboard), a motion data source (e.g., a pointing device, such as a computer mouse), and other sources (e.g., file sharing source or a source of a customized real-time data stream). Exemplary sinks include an audio sink (e.g., an audio rendering device, such as a speaker or headphones), a video sink (e.g., a video rendering device, such as a display monitor), a chat sink (e.g., a text rendering device, such as a display monitor), a motion data sink (e.g., a movement rendering device, such as a display monitor), and other sinks (e.g., a printer for printing shared files, a device for rendering real-time data streams different from those already described, or software that processes real-time streams for analysis or customized display). Each source has an active state in which the source is available for originating data and an inactive state in which the source is not available for originating data. Likewise, each sink has an active state in which the sink is available for receiving data and an inactive state in which the sink is not available for receiving data. The communicants operating the client nodes 12, 14 typically can control the states of the sources and sinks using controls provided by the communications applications 26, 32. For example, in some examples, the communications applications 26, 32 provide user controls for turning on/off the local microphones and the local speakers (e.g., headsets) on the client network nodes 12, 14.

The virtual area platform 18 includes at least one server network node 40 that provides a network infrastructure service environment 42 that manages sessions of the first and second client nodes 12, 14 in one or more virtual areas 44 in accordance with respective virtual area applications 46. One or more of the virtual area applications 44 typically are synchronous conferencing applications that support one or more types of communications between the client nodes 12, 14 (e.g., text chat, audio conferencing, video conferencing, application sharing, and file sharing). The network infrastructure service environment 42 typically includes one or more network infrastructure services that cooperate with the communications applications 26, 32 in the process of establishing and administering network connections between the client nodes 12, 14 and other network nodes. Among the network infrastructure services that are included in the example of the network infrastructure service environment 42 are an account service, a security service, an area service, a rendezvous service, an interaction service, and a capabilities engine. The area service administers a virtual area 44 by managing sessions of the first and second client nodes 12, 14 in the virtual area 44 in accordance with the virtual area application 46. Examples of the virtual area platform 18 and the virtual area applications 46 are described in U.S. Provisional Patent Application No. 61/563,088, filed Nov. 23, 2011. Examples of an account service, a security service, an area service, a rendezvous service, and an interaction service are described in U.S. patent application Ser. No. 12/630,973, filed Dec. 4, 2009. Examples of a capabilities engine are described in U.S. Provisional Patent Application No. 61/535,910, filed Sep. 16, 2011.

The network infrastructure service environment 42 maintains a relationship database 47 that contains the records 48 of interactions between communicants and social network profiles 50 that are associated with respective communicants. Each interaction record describes the context of an interaction between a pair of communicants. Each social network profile 50 typically includes: identity characteristics (e.g., name, age, gender, and geographic location information such as postal mailing address) that describe a respective communicant or a persona that is assumed by the communicant; explicit relationship information that is declared by the communicant; and relationship information that is inferred from the communicant's interactions in the network communication environment 10. Additional details regarding the relationship database 47 and the search and retrieval functionalities associated with the relationship database as described in U.S. patent application Ser. No. 12/354,709, filed Jan. 15, 2009, U.S. patent application Ser. No. 12/418,243, filed Apr. 3, 2009, U.S. patent application Ser. No. 12/631,026, filed Dec. 4, 2009, and U.S. patent application Ser. No. 13/432,837, filed Mar. 28, 2012.

Some examples provide systems and methods for encapsulating assemblies (e.g., meetings, informal gatherings, and the like) of communicants in one or more virtual areas based on information obtained from the interactions records 48. These examples provide a wide variety of ways in which to capture features of ongoing and completed assemblies and visualize those features at different levels of detail. Examples of systems and methods of encapsulating and visualizing assemblies of communicants in virtual areas are described in U.S. patent application Ser. No. 13/432,837, filed Mar. 28, 2012.

The communications applications 26, 32, the area applications 46, and the network infrastructure service environment 42 together provide a platform that administers the realtime connections with network nodes in an instance of a virtual area subject to a set of constraints 43 (e.g., capabilities and other types of permissions, rules, and preferences). Each of the virtual area applications 46 is hosted by a respective one of the virtual areas 44 and includes a description of the respective virtual area 44. Communicants respectively operating the client nodes 12, 14 connect to the virtual areas 44 through the virtual area communications applications 26, 32.

The communications applications 26, 32 typically present respective views of the virtual areas 44 in accordance with data received from the network infrastructure service environment 42. The communications applications 26, 32 also provide respective interfaces (e.g., one or more of a voice input interface, and audio output interface, and a visual graphical user interface) for receiving commands from the communicants. In visual graphical user interfaces, communicants typically are represented in the virtual areas 44 by respective avatars (e.g., sprites). In audio output interfaces, communicants' states and activities are described using audio signals (e.g., synthesized speech). Communicant avatars typically move about the virtual areas 44 in response to commands that are input by the communicants at their respective network nodes. In some examples, the communications applications 26, 32 establish realtime data stream connections between the first and second client network nodes 12, 14 and other network nodes connected to the virtual area 44 based on the positions of the communicants' avatars in the virtual areas 44. In some examples, each of the client network nodes 12, 14 includes a respective realtime kernel of the type described in U.S. patent application Ser. No. 12/630,973, filed Dec. 4, 2009, which supports remote configuration of stream handlers for processing data streams (e.g., rendering audio and video data streams) on a client network node.

A virtual area 44 may correspond to an abstract (non-geometric) virtual area that is defined with respect to abstract coordinates, or a visual virtual area that is defined with respect to one-, two- or three-dimensional geometric coordinates. Abstract virtual areas may or may not be associated with respective visualizations, whereas visual virtual areas are associated with respective visualizations.

In some of the examples that are described herein, the virtual areas are visual virtual areas of the type disclosed in U.S. Pat. Nos. 7,769,806 and 7,844,724. These visual virtual areas include physical geometry and collision geometry. The physical geometry describes the shape of the virtual area. The physical geometry typically is formed from surfaces of triangles, quadrilaterals, or polygons. Colors and textures are mapped onto the physical geometry to create a more realistic appearance for the virtual area. Lighting effects may be painted onto the visual geometry and the texture, color, or intensity near the lighting effects may be modified. The collision geometry describes invisible surfaces that determine the ways in which objects can move in the virtual area. The collision geometry may coincide with the visual geometry, correspond to a simpler approximation of the visual geometry, or relate to application-specific requirements of a virtual area designer.

Some examples of the virtual area platform 18 enable software application designers to define the semantics of position in an abstract virtual area (e.g., a software application or a computer data file). Through associations with respective connection rules, these position definitions can be used, for example, to drive connections to virtual areas, entries into virtual areas, connections to communicants and other sources or sinks of realtime data streams, and determinations of presence data relating to communicants, network resources, and network services. Additional details regarding systems and methods of defining the semantics of position in abstract virtual areas are described in U.S. application Ser. No. 12/631,008, which was filed on Dec. 4, 2009.

A virtual area typically includes one or more zones. A zone may be a rendered spatial extent, a set of rules applied to a spatial extent, or both. Zones may be arranged hierarchically in a virtual area, with an outermost zone (referred to herein as the "global governance zone") enclosing all other zones in the virtual area. Within the global governance zone, there can be location zones (e.g., rooms of a virtual area) or smaller governance zones that enclose a group of location zones and provide regions of governance on the map. A zone definition typically also includes one or more channel definitions that describe how to create respective channels in the zone and specify the information about the channel that is published to a client network node that becomes present in the zone. A channel is always uniquely defined point-to-point and is unique to a virtual area application and a session between a client network node and the virtual area platform.

Examples of the types of rules that may be associated with a zone include switching rules, governance rules, and permission rules.

Switching rules govern realtime stream connections between network nodes that are linked to the virtual area (e.g., network nodes that are associated with objects, such as avatars, in the virtual area). The switching rules typically include a description of conditions for connecting sources and sinks of realtime data streams in terms of positions in the virtual area. Each switching rule typically includes attributes that define the realtime data stream type to which the rule applies and the location or locations in the virtual area where the rule applies. In some examples, each of the rules optionally may include one or more attributes that specify a required role of the source, a required role of the sink, a priority level of the stream, and a requested data routing topology. In some examples, if there are no explicit switching rules defined for a particular part of the virtual area, one or more implicit or default switching rules may apply to that part of the virtual area. One exemplary default switching rule is a rule that connects every source to every compatible sink within a zone of a virtual area, subject to policy rules. Policy rules may apply globally to all connections between the area clients or only to respective connections with individual area clients. An example of a policy rule is a proximity policy rule that only allows connections of sources with compatible sinks that are associated with respective objects that are within a prescribed distance (or radius) of each other in the virtual area. The network connections between network nodes may be arranged in a variety of different data routing topologies, including a peer-to-peer topology, a mediated topology (i.e., a topology in which connections between network nodes are mediated by another network node, such as a server network node, a client network node, or a network switch), and hybrid architectures that combine aspects of peer-to-peer and mediated architectures. In some examples, the switching rules dictate how local connection processes executing on each of the network nodes establishes communications with the other network nodes based on the locations of the associated objects in the zones of the virtual area. A switching rule also may define a direct connection between network nodes or an indirect connection through an intermediate network node (e.g., the proxy node 19 shown in FIG. 1).

Governance rules control who has access to resources (e.g., the virtual area itself, regions with the virtual area, and objects within the virtual area), who has access to data (e.g., data streams and other content) that is associated with the virtual area, what is the scope of that access to the data associated the virtual area (e.g., what can a user do with the data), and what are the follow-on consequences of accessing that data (e.g., record keeping, such as audit logs, and payment requirements). In some examples, an entire virtual area or a zone of the virtual area is associated with a "governance mesh" that enables a software application developer to associate governance rules with a virtual area or a zone of a virtual area. This avoids the need for the creation of individual permissions for every file in a virtual area and avoids the need to deal with the complexity that potentially could arise when there is a need to treat the same document differently depending on the context.

A permission rule defines a respective capability requirement (e.g., for a respective action, behavior, or state) in terms of one or more capabilities, attributes, and settings, which may be persistent or transient. Examples of permission rules include: a rule that conditions a communicant's ability to enter a target zone on the communicant having a CanEnterZone capability for the target zone; a rule that conditions the ability of a grantee communicant to open a target door of a target room on the grantee communicant having a CanOpenDoor capability for the target room; and a rule that conditions the transmission of a message describing the state of a particular communicant's avatar in a zone to a recipient having a CanSeeState capability for the particular communicant in the zone. A capability provides permission for a client to perform some action within the application. For example, a client may be granted the capability "CanEnterZone" for a specific zone within a virtual area that has been defined with that capability requirement. The client that has the capability can enter the zone, whereas a client without the capability would have their RDS state change rejected when they tried to enter the zone. Examples of capabilities systems for administering permission rules are described in U.S. Provisional Patent Application No. 61/535,910, filed Sep. 16, 2011.

As explained above, the zones of a virtual area can be associated with respective switching rules, each of which instructs the area service to connect sources of a respective data stream type that are associated with a designated source zone with sinks of the respective realtime data stream type that are associated with a designated sink zone. Network nodes can establish respective presences in the zones of a virtual area. In some examples, network nodes associated with respective objects (e.g., avatars representing the communicants operating the network nodes) that can be moved to different locations in the virtual area, and the network nodes are present in the zones in which the associated objects are located. The area service administers data stream connections between the network nodes based on the switching rules, the respective sources and sinks associated with the network nodes, and the respective zones of the virtual area in which the objects are located.

The virtual area platform 18 enables a wide variety of highly customizable virtual area applications to be created. Examples of such applications include virtual area applications for creating a virtual office, a virtual personal space, a virtual art gallery, a virtual concert hall, a virtual auditorium, a virtual conference room, and a virtual clubhouse. The virtual area platform 18 supports the creation of network connections between network nodes in the same zone of a virtual area, as well as the creation of one-way or two-way data stream connections between network nodes in different zones.

A virtual area typically is associated with a specific set of communicants (e.g., members of the virtual area) and a plurality of persistent zones that define respective sub-contexts within the virtual area. Each zone of a virtual area may support an independent communication session between the network nodes in the zone. For example, a virtual area may include zones in which audio, video, and text chat channel connections are established only between the sources and sinks of network nodes that are in the same zone. In addition, one or more attributes or other data (e.g., a name, a designated purpose, membership, or associated history of interaction in the zone) may be associated with a virtual area zone to define a specific persistent virtual communication context that represents a particular persistent communication opportunity within the virtual area for organizing a communicant's communications with others. In addition, a virtual area may include multiple zones that provide different contexts for the presence states of the user and other communicants in those zones. Each zone may be associated with one or more semantic signifiers (e.g., a textual label, a visual design or a spatial layout, or other elements) that connote a particular context from which other communicants can infer a multi-dimensional presence state for the communicants who are present in the zone. In some embodiments, a spatial metaphor enriches the presence states within a zone with location-based cues, such as proximity of communicants to elements of the zone or proximity of communicants to each other. In some examples, the visual and audio interfaces that are provided on the client network nodes are configured to present realtime indications of all the independent communication sessions that are occurring in the virtual area. This allows a user to visualize multiple concurrent independent communication interactions and thereby quickly learn who is interacting with whom and the contexts of those interactions (as defined by the zones in which the interactions are occurring).

Figure 5:
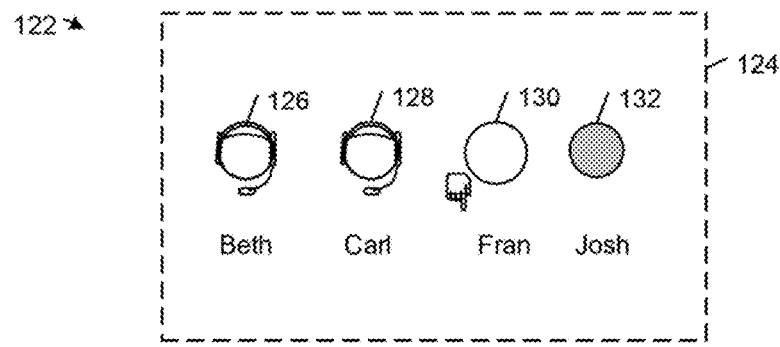
FIG. 5 is a diagrammatic view of an example of a virtual area.

FIG. 5 shows an example of a virtual area 122 that includes a single non-visual global governance zone 124 in which communicants are represented by respective graphical representations 126, 128, 130, and 132. The graphical representations 124, 126, 128, and 130 include respective decorations or embellishments that indicate the states and/or realtime activities of the communicants, as described in detail below. The global governance zone 124 is associated with a switching rule that prescribes that chat streams sourced by network nodes in the global governance zone 124 be published on a respective chat channel that other network nodes in the global governance zone 124 can subscribe to, enabling communicants in anywhere in the virtual area 122 to communicant with one another via text chat and to access an area-wide chat history that the virtual area platform 18 maintains for the virtual area 122.

Figure 6:
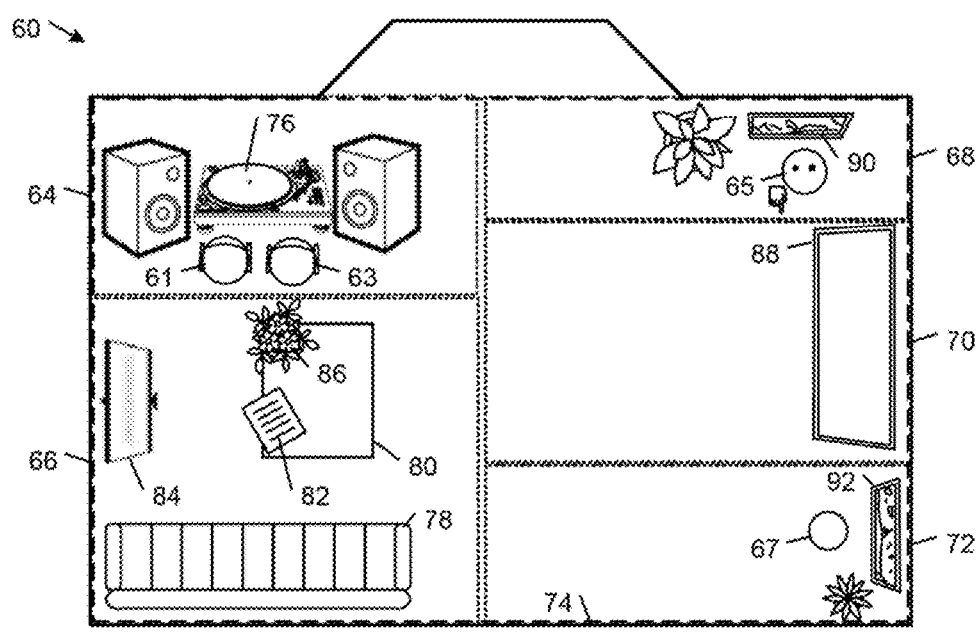
FIG. 6 is a diagrammatic view of an example of a virtual area.

FIG. 6 shows an example of a virtual area 60 that is associated with a two-dimensional visualization of a residential room that includes six zones: a visual audio zone 64, a visual document sharing zone 66, a visual first image sharing zone 68, a visual video zone 70, a visual second image sharing zone 72, and a global governance zone 74 with a boundary that coincides with the outer visual boundary of the virtual area 60. Graphical representations 61, 63, 65, and 67 of communicants are shown in respective ones of the zones in which the communicants are present.

The visual zones 64-72 and the global governance zone 74 are associated with respective switching rules that define how data streams are sourced and sunk in the virtual area 60. In the illustrated example, each of the visual zones 64-72 is associated with a respective switching rule that prescribes that audio streams sourced by network nodes in the zone be published on a respective voice control channel that other network nodes in the zone can subscribe to, enabling communicants in the same zone to communicate with each other via voice. The global governance zone 74 is associated with a switching rule that prescribes that chat streams sourced by networks in the global governance zone 74 be published on a respective chat channel that other network nodes in the global governance zone 74 can subscribe to, enabling communicants in any of the visual zones 64-72 to communicant with one another via text chat and to access an area-wide chat history that the virtual area platform 18 maintains for the virtual area 60. The global governance zone 124 also is associated with a switching rule that prescribes that audio streams sourced by network nodes in the global governance zone 124 be published on a respective audio channel that other network nodes in the global governance zone 124 can subscribe to, enabling communicants anywhere in the virtual area 122 to communicant with one another via voice.

Each of the visual zones 64-72 contains objects and visual embellishments that suggest the intended function of the zone.

For example, the visual audio zone 64 includes a sound system object 76 that is associated with one or more audio streaming services (e.g., Pandora Radio, iTunes, Slacker Radio) that enable communicants to stream audio content to their respective client network nodes. In this example, the visual audio zone 64 is associated with a respective switching rule that prescribes that audio streams sourced by the sound system object 76 be published on a respective audio control channel that network nodes in the zone can subscribe to, enabling communicants in the zone to receive and co-consume the audio streams from the one or more audio services.

The visual document sharing zone 66 includes a couch object 78, a table object 80 supporting a document object 82, a viewscreen object 84, and a plant embellishment 86. The couch object 78 includes seat positions where communicant avatars may be located and has a visualization that connotes activities or states of mind that typically are associated with sitting (e.g., private conversation, waiting, or reading a data file associated with the document object 82).

The table object 80 typically is associated with file sharing functionality of the virtual area platform 18 that enables communicants to upload computer data files to server storage in association with the document sharing zone 66 and to download data files that are associated with the document sharing zone 66 from the server storage to the respective client network nodes. In the example shown in FIG. 6, the document object 82 is associated with a computer data file that has been uploaded to the virtual area platform 18 in association with the document sharing zone 66. The document object 82 may be selected by a communicant (e.g., by double-clicking the document object 82 with an input device, such as a computer mouse) to initiate downloading of the associated computer data file to the communicant's client network node. In other examples, the table object 80 is associated with one or more news content delivery services (e.g., CNN, National Public Radio, New York Times, Wall Street Journal, and Wired magazine). In these examples, the visual document sharing zone 66 is associated with a respective switching rule that prescribes that data sourced by the table object be published on a respective news content control channel that network nodes in the zone can subscribe to, enabling communicants in the zone to receive and co-consume news content from the one or more news content delivery services.

The viewscreen object 84 typically is associated with application sharing functionality of the platform that enables communicants in the document sharing zone 66 to share applications (e.g., desktop publishing applications, such as the Microsoft Word® application, and web browsing applications, such as the Microsoft Internet Explorer® web browser application) operating on their respective client network nodes. In some examples, the application sharing is achieved by peer-to-peer screen sharing from a sharing client network node to one or more subscribing ones of the other network nodes in the zone 80 as described in U.S. application Ser. No. 12/418,270, filed Apr. 3, 2009. In this example, the visual document sharing zone 66 is associated with a respective switching rule that prescribes that application sharing data streams sourced by the viewscreen object 76 be published on a respective application sharing control channel that network nodes in the zone can subscribe to, enabling other communicants in the zone to receive the application sharing streams being shared by the sharing client network node.

The visual video zone 70 includes a video system object 88 that typically is associated with one or more video streaming services (e.g., the Hulu®, YouTube®, and Netflix® media streaming services) that enable communicants to stream video content to their respective client network nodes. The visual video zone 70 also is associated with a respective switching rule that prescribes that video streams sourced by the video system object 88 be published on a respective video control channel that network nodes in the zone can subscribe to, enabling communicants in the zone to receive and co-consume video streams from the one or more video services.

Each of the first and second image sharing zones 68, 72 is associated with a respective image viewing object 90, 92 that typically is associated one or more image sharing services (e.g., any of the Facebook®, Flickr®, and Picasa® image sharing services) that enable communicants to stream image content to their respective client network nodes. Each of the first and second image sharing zones 68, 72 also is associated with a respective switching rule that prescribes that image data streams sourced by the respective image viewing object 90, 92 be published on a respective image control channel that network nodes in the zone can subscribe to, enabling communicants in the zone to receive and co-consume images from the one or more image sharing services.

In some examples, an area object represents a virtual area. In these examples, the virtual area platform 18 generates for each virtual area a respective area object that is linked to a variety of different types of information relating to the virtual area. An area object is a data structure that has an identity property that distinguishes it from other meeting objects, a state property that describes the data stored in the object, and a behavior property that describes the methods in the object's interface by which the object can be used. The virtual area platform 18 may link a wide variety of information to an area object, including, for example:

time information (e.g., times when communicants joined and left a virtual area, start and end times of meetings between co-present communicants, times when recordings started and stopped, and times when files are uploaded to a virtual area or zone);

location information (e.g., a virtual area identifier that uniquely identifies a virtual area, and a zone identifier that uniquely identifies a zone of a virtual area, and other information about the virtual location or locations in which communicants are present or interactions between network nodes occurred or are occurring);

communicant information (e.g., communicant identifiers that uniquely identify communicants and other communicant information);

information describing interactions between communicants (e.g., an interaction history);

information exchanged between communicants (e.g.: realtime data streams, such as recorded chat data, audio data, and video data;

recorded application sharing data; recorded co-browsing data; and data files uploaded by communicants to a virtual area or zone); and information submitted by communicants for association with respective virtual areas, assemblies in virtual areas, or area activity summaries (e.g., labels or titles, notes, follow-up tasks, comments and other feedback).

In some examples, the virtual area platform 18 associates with each of respective ones of the area objects one or more of: a zone identifier value identifying the zone in which the respective communicant interaction or other event occurred; one or more communicant identifier values identifying respective ones of the communicants who participated in the respective interaction or other event; and one or more time parameter values associated with the respective interaction or other event. In some examples, the virtual area platform 18 records text chat data streams transmitted between communicants in a virtual area, and associates the recorded text chat data with the area object for that virtual area. In some examples, the virtual area platform 18 records one or more data streams (e.g., an audio data, a video data stream, and an application sharing data stream) that are transmitted between communicants in a virtual area, and associates the one or more recorded data streams with the area object for that virtual area. In some examples, the virtual area platform 18 associates a file shared by a communicant in a virtual area with the area object for that virtual area. In some examples, the virtual area platform 18 associates with a respective one of the area objects a respective label (e.g., a name or a descriptive title) submitted by a communicant in connection with an interaction or event (e.g., an assembly of communicants) in the corresponding virtual area. In some examples, the virtual area platform 18 associates with an area object a respective link to a note submitted in connection with an interaction or event in the associated virtual area. In some examples, the virtual area platform 18 associates with an area object a respective link to a description of follow-up tasks submitted in connection with an interaction or event in the corresponding virtual area. In some examples, the virtual area platform 18 associates respective status indicators with respective ones of the area objects, where each status indicator typically includes an indication of the state of an interaction or other event in the associated virtual area (e.g., whether an assembly in the virtual area is in-progress or has ended).

In some examples, the virtual area platform 18 receives one or more feedback submissions regarding a respective interaction or event in association with the area activity summary data for the corresponding virtual area, and associates the one or more feedback submissions with the area object for that virtual area. In some examples, the virtual area platform 18 receives one or more communicant submissions on the merits of a particular interaction or event in association with the area activity summary data for the corresponding virtual area, determines a score based on the one or more received communicant submissions, and associates the score with the area object for the corresponding virtual area.

Figure 7A:
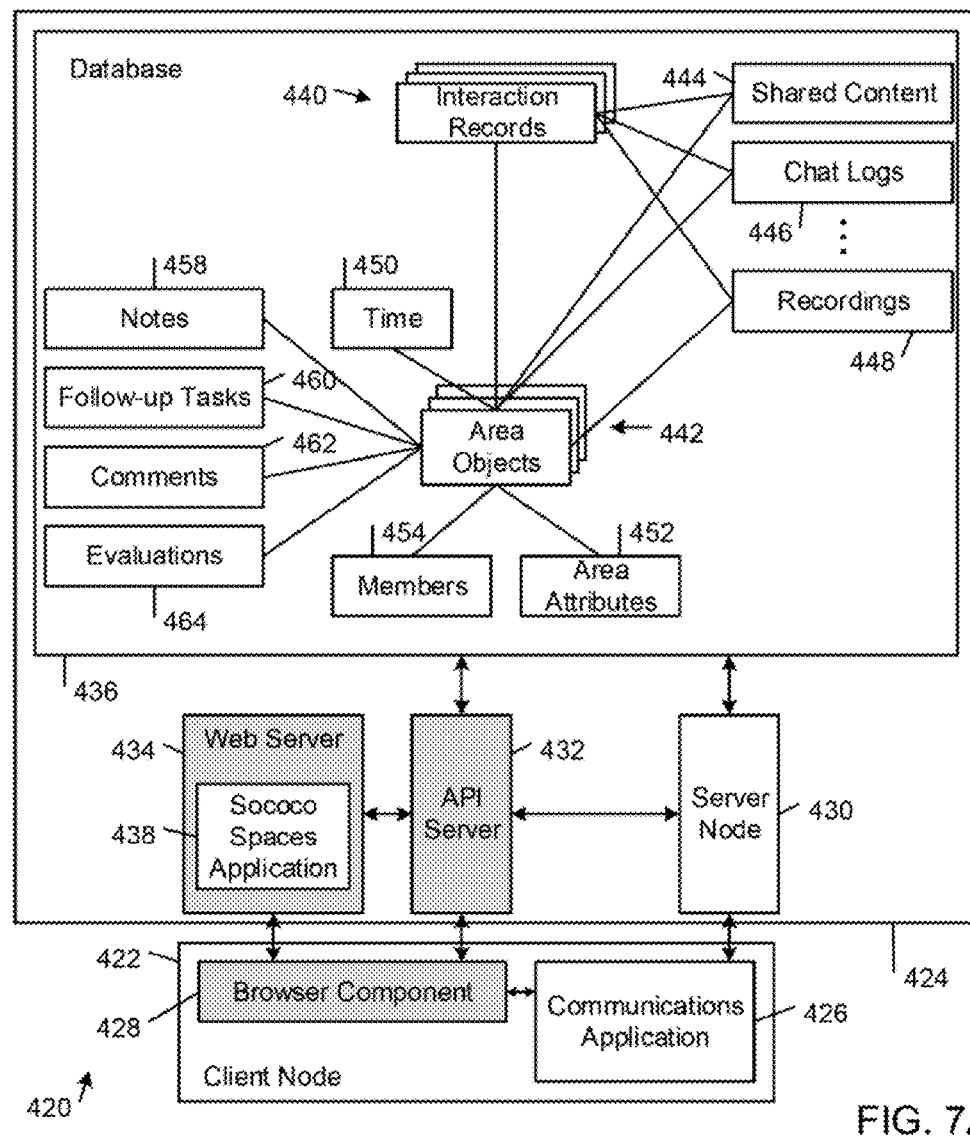
FIG. 7A shows an example of a network communications environment.

FIG. 7A shows an example 420 of the network communications environment 10 that includes an example 422 of the client network node 12 and an example 424 of the virtual area platform 18.

The client network node 422 includes an example 426 of the communications application 26 and a browser component 428. The communications application 426 includes a user interface component that generates a graphical user interface that interfaces the user to the realtime communications and network browsing functionalities of the browser component. The communications application 426 establishes with other client network nodes respective peer-to-peer sessions for exchanging realtime communications (e.g., transmitting realtime audio, video, and application sharing information) and establishes with the server node 430 a server session for exchanging control information, realtime activity information, and state information. The browser component 428 provides a set of web browsing functions, including browser functions, document viewing functions, and data downloading functions. The browser component 428 may be integrated into the communications application 426 or it may be implemented by a separate browser component (e.g., a plug-in) that exposes an API through which the communications application 426 may call methods that are available from the browser component, including browsing methods, document rendering methods, and data downloading methods. In other examples, the functionality of the browser component 428 is provided by a standalone web browser application (e.g., Google Chrome™, Apple Safari®, Mozilla Firefox®, and Microsoft Internet Explorer® web browser applications) that is not integrated with the communications application 426.

The virtual area platform 424 includes an example 430 of the server node 40, an API (Application Programming Interface) server 432, a web server 434, and a database 436.

The database 436 includes interaction records 440 and area objects 442. As explained above, each interaction record describes the context of an interaction between a pair of communicants. In addition to identifying the communicants involved, the place of interaction, and start and end times of the interaction, an interaction record also may include links to other information relating to the interaction, including any shared content 444, chat logs 446, and recordings 448. Each area object describes information relating to a particular virtual area. In some examples, this information includes time information 450, area attributes 452, area membership information 454, and links to other information relating to interactions between communicants and assemblies of co-present communicants, including any label information 456, notes 458, follow-up tasks 460, comments 462, evaluations 464, shared files 444, chat logs 446, and recordings 448. In some examples, the server node 430 manages the collection of information that is incorporated into the interaction records 440 and the area objects 442. In these examples, the server node 430 monitors communicant interactions in a virtual area and stores data relating to those interactions in memory. In some examples, whenever a pair of co-present communicants is detected, the server node 430 generates interaction records 440 from the information stored in memory on a regular interval. Similarly, whenever an assembly of copresent communicants is detected, the server node 430 generates meeting records from the information stored in memory on a regular interval. Thus, in these examples, the interaction records 440 and the area objects are different views on the same communicant interaction data that is stored in memory.

The API server 432 includes one or more libraries of functions that manage accesses to the database 436. In some examples, the API server 432 provides a REST (REpresentational State Transfer) style of web API through which the server node 40 and the web server 434 are able to create, read, update, and delete entries in the database 436. The API server 432 can retrieve a particular one of the data files based on results of a query on the interaction records 440 and area objects 442 requested by a particular network node. In response to the request, the API server 432 typically transmits to the particular network node a storage location identifier associated with the particular data file, or it may transmit to the particular network node information derived from one or more of the database entries identified in a result of a query on the database 436.

The web server 434 delivers network resources in response to requests from the browser component 428 executing on the client network node 422. The information resources typically are delivered in accordance with the hypertext transfer protocol (HTTP). The information resources commonly are hypertext documents (e.g., Hyper-Text Markup Language (HTML) documents), which may reference, for example, images, style sheets, scripts (e.g., JavaScripts), and streaming data (e.g., streaming audio data, streaming video data, other streaming information, such as realtime stock quotes and realtime alerts and other event information). The web server 434 hosts a Sococo Spaces application 438 that delivers user interface content and functionality to the browser component 428 on the client network node 422. In this process, the web server 434 delivers HTML documents, style sheets, and scripts from which the browser component 428 creates a Sococo Spaces application user interface for retrieving information from and sending information to the Sococo Spaces application 328. In some examples, the Sococo Spaces application user interface is generated in a pane of a communications user interface generated by the communications application 426.

Realtime communications between the various nodes 422, 430, 432, and 434 may be carried over a realtime transport layer. In some examples, instead of receiving updates on polling or on page load, some examples receive updates in realtime using any of a variety of technologies (e.g., Socket IO or WebSockets). In some examples, realtime audio and video streams may be rendered in accordance with any of a variety of realtime rendering technologies (e.g., HTML5 audio or video tags, or Flash audio or video interfaces).

Figure 7B:
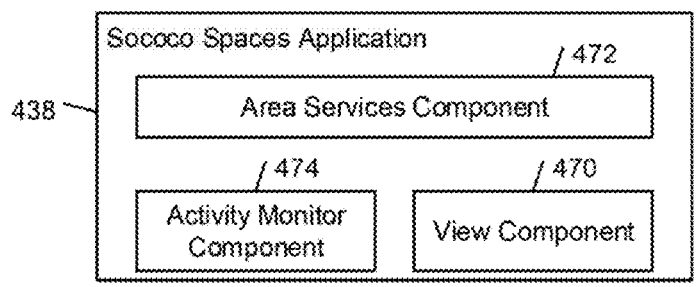
FIG. 7B shows an example of an application.

FIG. 7B shows an example of the Sococo Spaces application 438 that runs on the web server 434. The Sococo Spaces application 438 includes a view component 470, an area services component 472, and an activity monitor component 474. The view component 470 delivers user interface content and functionality to the browser component 428 on the client network node 422. Responsive to requests received from the browser component 428 on the client network node 422, the area services component 472 manages the creation, reading, updating, and deleting of data associated with the area objects 442, including the area objects themselves and information linked to the area objects. In some examples, each of the area objects 422 is associated with a respective unique identifier (e.g., a universally unique identifier, UUID) and the information that is linked to an area object is represented by an endpoint in the API server 432 that allows the area services component 472 to perform one or more database operations on that information (e.g., create, read, update, and delete). For example, the notes that are associated with an area object that is created for an assembly in the Sococo-HQ virtual area and has the UUID "meetingID_001" may be retrieved by the area services component 472 with a request to the API server 432 that includes the endpoint "/space/sococo-hq/meetings/meetingID_001/notes." Through requests sent to the API server 432, the activity monitor component 474 monitors changes to areas and their respective area objects. The activity monitor component 474 informs the view component 470 of any changes, and the view component 470 sends updates to the browser component 428, which updates the user interface presented to the user in the graphical user interface created by communications application.

In operation, the browser component 428 sends to the web server 434 a request for the Sococo Spaces application user interface and application logic. The browser component 438 loads the application logic and the Sococo Spaces application user interface. Based on the application logic, the browser component 428 generates the Sococo Spaces application user interface in the graphical user interface of the communications application 426. Based on user input selecting a particular visualization of the area object data, the browser component 428 requests area object data from the API server 432 (e.g., using Socket 10 or WebSockets) and then populates the Sococo Spaces application user interface with data (e.g., area activity summary data) that it receives from the API server 432. The web server 434 maintains persistent connections with the API server 432 and the browser component 428 so that it can receive updates about areas and their objects (e.g., participants joining and leaving an area and new information, such as praise, comments, notes, follow-up tasks, and other information that is attached to the area objects) from the API server 432 and deliver those updates to the browser component 428 on the client network node 422.

The Sococo Spaces application 438 provides one or more user interfaces for associating information with area objects. In some examples, the Sococo Spaces application 438 delivers one or more user interfaces that enable a user to specify one or more properties of an area object (e.g., an area label), specify which types of area related data should be recorded by the server node 430 and associated with the area object, and enter notes, follow-up tasks, comments, praise, and other feedback.

As explained in detail below, virtual areas of the types shown in FIGS. 5 and 6 may be initiated in a variety of different ways. In some examples, the virtual area 60 (FIG. 6) may have been initiated by a user who submitted a request to create a virtual area in connection with a context defined by a Twitter® microblog thread involving one or more communicants, a link to an audio track available from a streaming music network service, or real-world location data. Initially, a virtual area may consist of a single global governance zone that is provisioned for realtime chat communications between communicants. As additional context-defining data is associated with the virtual area as a result of, for example, individual communicant contributions or interactions between communicants, additional context-specific functionality may be added to the single zone of the virtual area or additional context-specific zones may be added to the virtual area. The virtual area platform may add the additional functionality and zones automatically as new data is associated with the virtual area or a user may explicitly add such functionality and zones by entering commands through the Sococo Spaces application user interface.

As explained above, the virtual area platform 18 creates virtual areas 44 based on contexts that are defined by users, the virtual area platform 18, or third party entities in terms of one or more of content, people, and real-world location.

Figure 8:
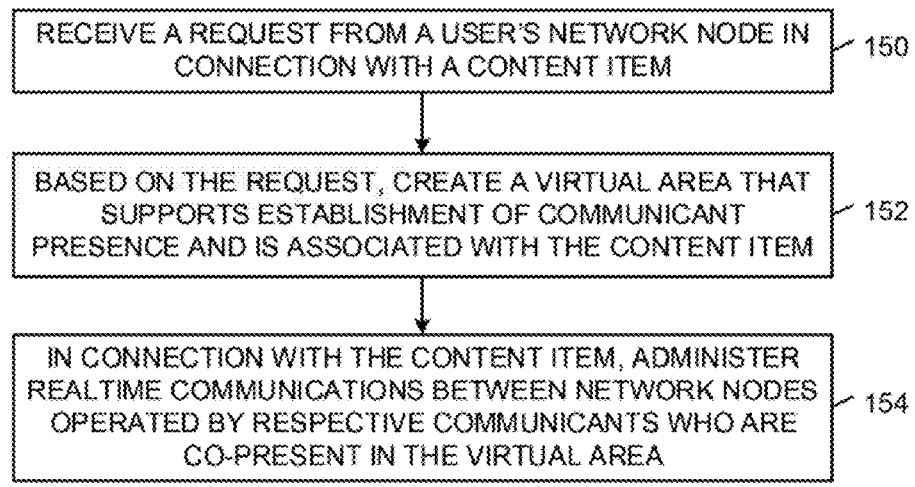
FIG. 8 is a flow diagram of an example of a context based virtual area creation method.

FIG. 8 shows an example of a method by which the virtual area platform 18 creates a virtual area based on contexts defined by content. In a network communications environment supporting realtime communications between respective network nodes of a user and other communicants, the virtual area platform 18 receives a request from the user's network node in connection with a content item (FIG. 8, block 150). Based on the request, the virtual area platform creates a virtual area that supports establishment of communicant presence and is associated with the content item (FIG. 8, block 152). In connection with the content item, the virtual area platform 18 administers realtime communications between network nodes operated by respective communicants who are present in the virtual area (FIG. 8, block 154).

In some examples, the content item includes one or more of image-based content (e.g., video content), conversation content (e.g., a topic thread), activity feed content describing activity of one or more communicants, and syndicated web feed content.

In some examples, the request includes an identifier of the user and optionally a respective identifier of each of one or more other communicants. In some of these examples, the virtual area platform 18 sends a list of communicants to the user's network node, and the request includes the user's selection of one or more communicants in the list. In the process of creating the virtual area, the virtual area platform 18 designates the user and each of the other communicants as a respective member of the virtual area.

In some examples, the request includes an identifier of the content item, and the virtual area platform associates the content item identifier with the virtual area. In some examples, the virtual area platform 18 receives from a web browser component of the user's network node a request that includes a uniform resource locator (URL) value that is associated with the content item, and the virtual area platform 18 associates the URL with the virtual area. In some examples, the request includes a topic label, and the virtual area platform associates the topic label with the virtual area.

After the virtual area has been created, the virtual area platform may associate with the virtual area a variety of other information including, for example, information relating to communicant interactions in the virtual area (e.g., recorded data streams, such as text chat data, voice data, and application sharing data, and logged event data).

In some examples, the virtual area platform determines summary data from information relating to communicant interactions in the virtual area, and publishes the summary data as an activity feed to which network nodes may subscribe. The virtual area platform typically incorporates a link for navigating to the virtual area in the summary data.

Figure 9:
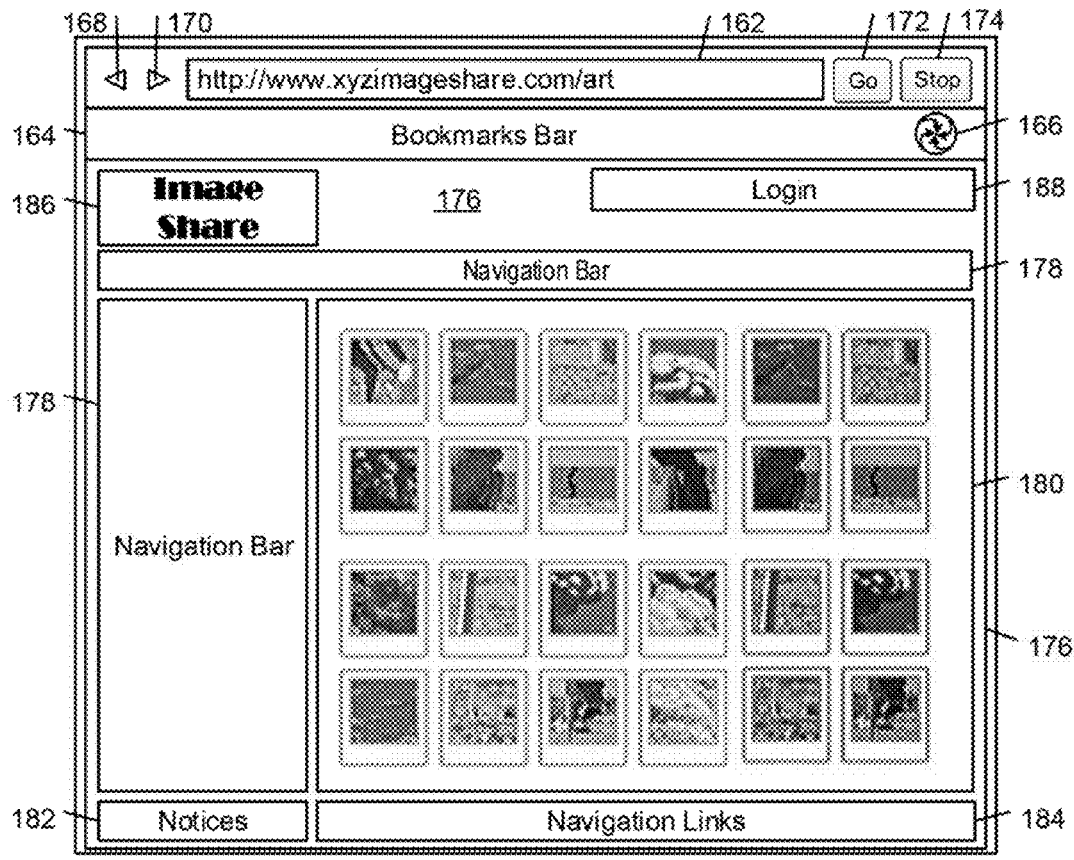
FIG. 9 is a diagrammatic view of an example of a graphical user interface.

FIG. 9 shows an example of a graphical user interface 160 for a web browser component of a user's client network node that enables the user to quickly create new virtual areas based on web content or associate web content with existing virtual areas.

The graphical user interface 160 includes an address bar 162, a bookmarks bar 164 that includes a Sococo Spaces button 166, back and forward navigation buttons 168, 170, a Go button 172, a Stop button 174, and a main browser panel 176 for displaying content (e.g., a web page) rendered by the rendering engine of the web browser component. A user can enter a URL of a network resource (e.g., web pages)

into the address bar 162 and select the Go button 172 to navigate to a particular network resource identified by the URL. In the illustrated example, the user has entered the URL "www.xyzimageshare.com/art" into the address bar 162 and selected the Go button 172. In response, the web browser component has navigated to a web page for browsing Art's image repository at the xyzimageshare.com web site. The web page includes a header section 176, a navigation bar 178, a contents section 180, notices 182, and navigation links 184. The header section 176 includes a logo 186 and a login section 188 that allows users to sign into their account with a web server that is serving the web page. The navigation bar 178 contains links (e.g., hypertext links) to other pages of a web site that includes the web page. The contents section 180 includes a set of content slots for respective content-based objects. In the illustrated example, the content-based objects are image thumbnails that are associated with links (e.g., URLs) to respective images contained in Art's image repository. The notices 182 typically include various legal (e.g., copyright) and other notices that the web site owner wishes to convey to users of the web site. The navigation links 184 include links to specific pages that are associated with the web site, including links to a search page, a link to a page that describes the terms and conditions relating to the use of the web site, a link to a page that provides a map of the web site, and a link to a help page.

Figure 10:
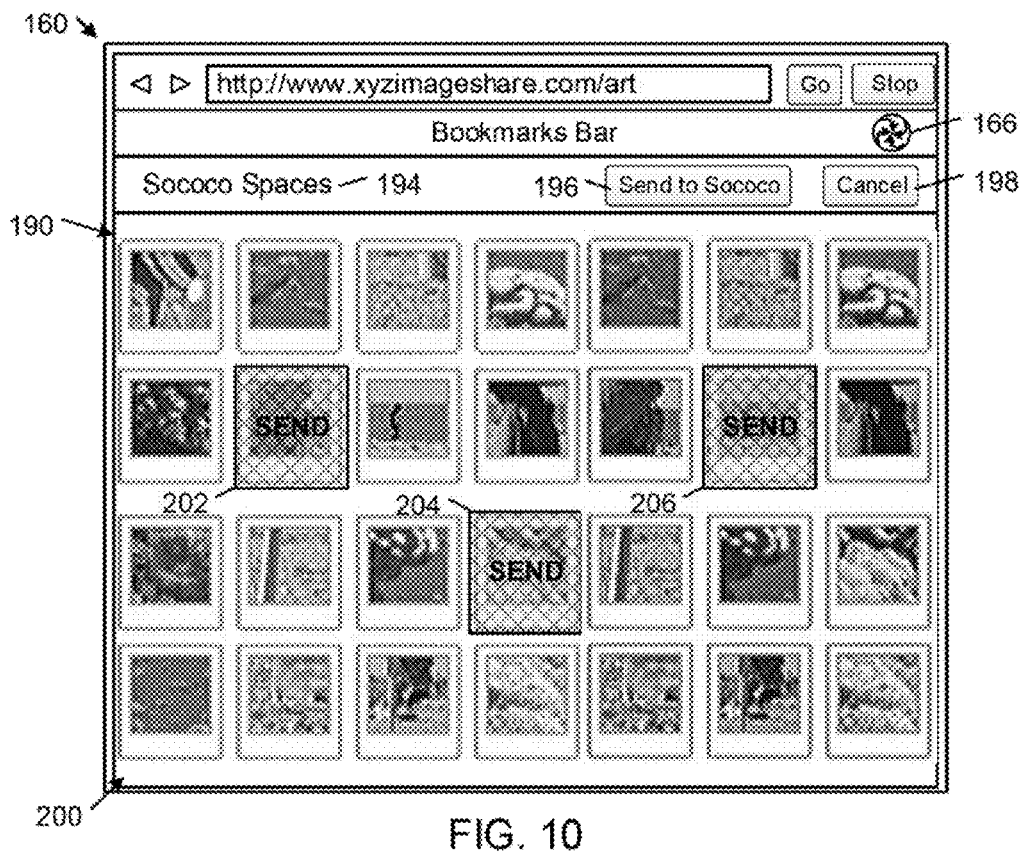
FIG. 10 is a diagrammatic view of an example of a graphical user interface.

Referring to FIG. 10, in response to user selection of the Sococo Spaces button 166, the web browser component sends to the virtual area platform 18 a request that includes the URL for the current web page (i.e., www.xyzimageshare.com) shown in the contents section 180. The virtual area platform 18 determines whether the current web page is associated with any content items of one or more particular content types (e.g., images, streaming media content, such as video and audio, and conversation thread content) that the virtual area platform 18 is configured to associate with virtual areas. If the virtual area platform 18 does not detect any content items of the particular content types associated with the current web page, the virtual area platform 18 returns a specification of a notification message that the web browser component displays to inform the user that the current web page does not contain any content items that can be associated with a virtual area. If the current web page contains one or more content items of the particular content types, the virtual area platform 18 extracts the one or more content items from the web page, generates a proof web page 190 containing a layout of graphical representations of the extracted content items and one or more controls, and sends the proof web page 190 to the web browser component for rendering in the graphical user interface 160.

In the illustrated example, the proof web page 190 includes a header section 192 that includes a "Sococo Spaces" label 194, a Send to Sococo button 196, a Cancel button 198, and a layout area 200 that shows the layout of the graphical representations of extracted content items (i.e., images). In response to user selection of individual ones of the graphical representations of the content items, the web browser component displays respective overlays 202, 204, 206 over the selected graphical representations. After selecting one or more graphical representations, the user can select the Send to Sococo button 196 or the Cancel button 198. In response to user selection of the Send to Sococo button, the web browser component sends to the virtual area platform 18 a request to associate the content items associated with the selected graphical representations with a virtual area.

Figure 11A:
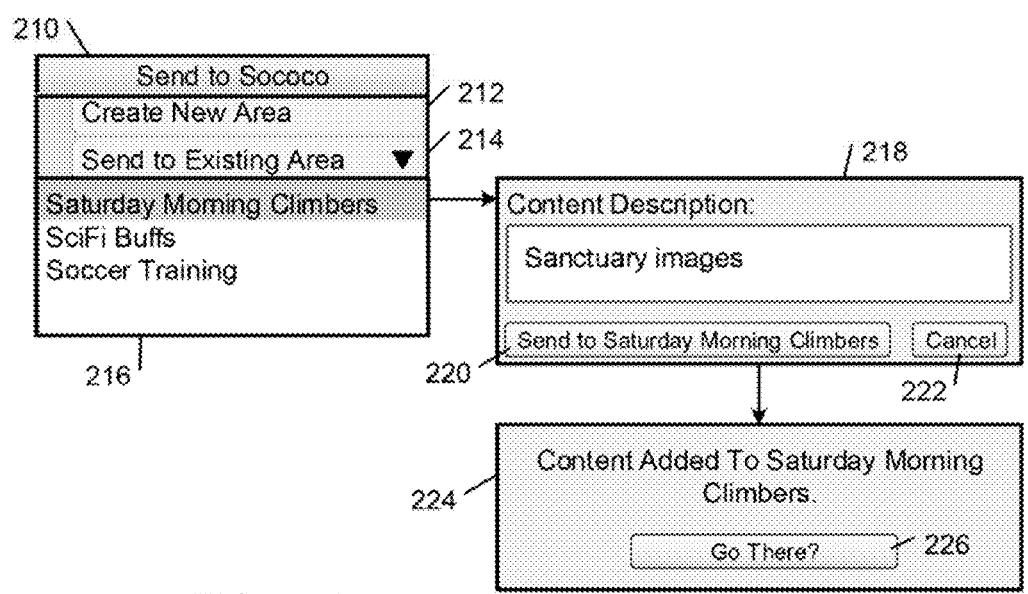
FIGS. 11A-11B are diagrammatic views of an example of a graphical user interface.
Figure 11B:
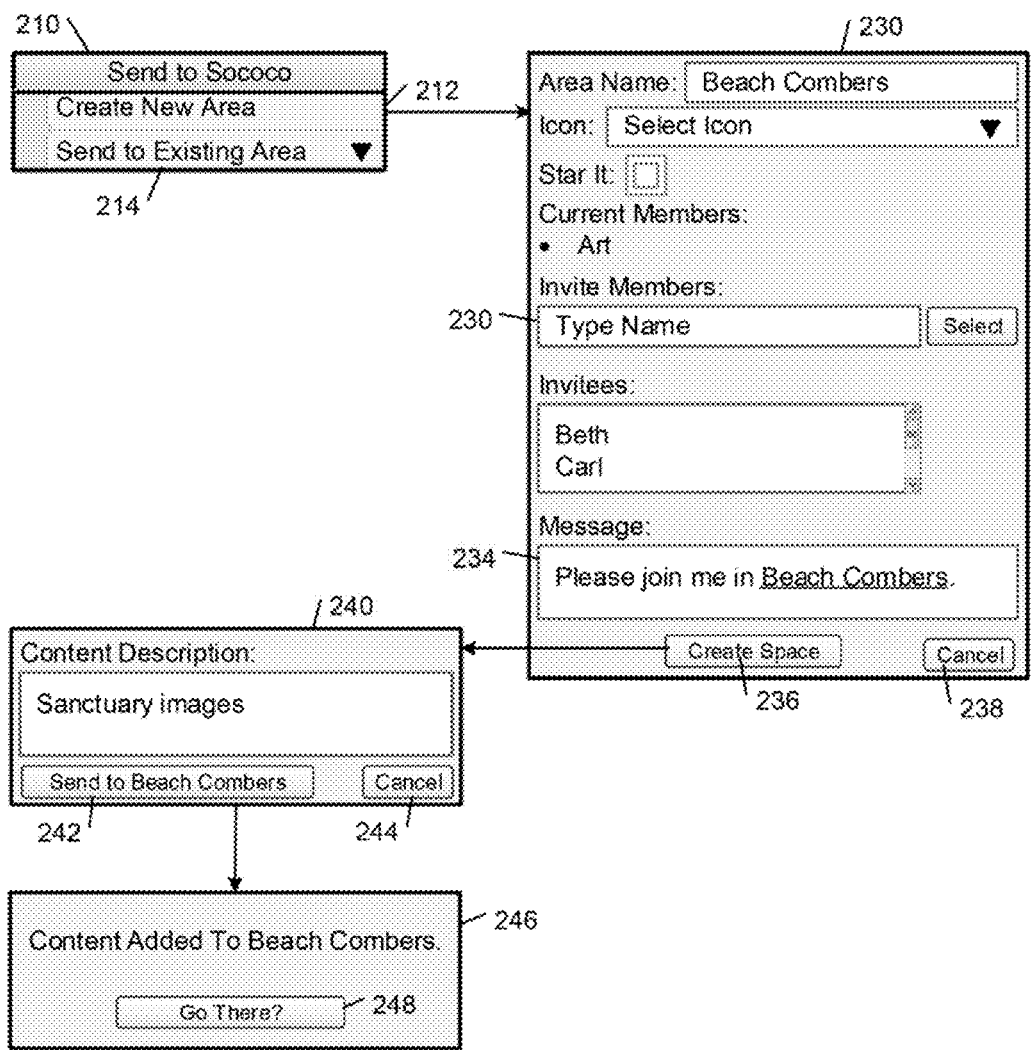

Referring to FIGS. 11A and 11B, in response to the association request, the virtual area platform 18 communicates with the web browser component of the user's client network node. In some examples, the virtual area platform 18 sends to the web browser component preformatted web documents (e.g., a hypertext markup language (HTML) document) that the browser component displays as interface components (e.g., dialog boxes) in the graphical user interface 160.

FIG. 11A shows an example of a dialog box 210 that includes a Create New Area menu entry 212 and a Send to Existing Area menu entry 214. The Create New Area menu entry 212 allows the user to associate the selected content items with a new virtual area, whereas the Send to Existing Area menu entry 214 allows the user to associate the selected content items with an existing virtual area.

In response to user selection of the Send to Existing Area menu entry 214, the web browser component displays a dropdown list 216 of names of existing virtual areas that are associated with the user (e.g., virtual areas of which the user is a member). In response to user selection of a respective one of the existing virtual area names in the list 216 (e.g., Saturday Morning Climbers), the web browser component generates a dialog box 218 that allows the user to enter a description of the selected content (e.g., "Sanctuary images") and select either a Send to Saturday Morning Climbers button 220 to send the content to the virtual area platform 18 for association with the existing Saturday Morning Climbers virtual area or a Cancel button 222 to cancel the process. In response to user selection of the Send to Saturday Morning Climbers button 220, the web browser component transmits the content description and links (e.g., URLs) for the selected content items to the virtual area platform 18. The virtual area platform 18 associates the selected content items with the designated virtual area and sends to the web browser component a notification 224 indicating that the selected content has been associated with the designated virtual area and a control 226 for navigating the user to the designated virtual area.

FIG. 11B shows an example of a dialog box 230 that the web browser component displays in response to user selection of the Create New Area menu entry 212 in the dialog box 210. The dialog box 230 allows the user to set certain attributes of the new virtual area that will be wrapped around the selected content items, including an Area Name (e.g., "Beach Combers") for the virtual area and an iconographic representation of the virtual area. The user also can selectively "star" the virtual area to indicate the virtual area platform 18 should treat the virtual area as a favorite area. The dialog box lists the current members of the new area, which automatically includes the user (i.e., "Art") who initiated the virtual area creation process. The dialog box 230 also includes an Invite Members box 232 that allows the user to designate new members who will be invited to the new virtual area and a Message box 234 that allows the user to specify a message (e.g., "Please join me in Beach Combers") that will be included with each invitation. In the illustrated example, the user has designated Beth and Carl as invitees to the new virtual area. The dialog box 230 includes a Create Space button 236 to initiate the virtual area creation process and a Cancel button 238 to cancel the process.

In response to user selection of the Create Space button 236, the web browser component transmits the new area attribute and invitee information to the virtual area platform 18. The virtual area platform 18 generates a new virtual area that is associated with the attribute and invitee information and sends to the web browser component a dialog box 240 that allows the user to enter a description of the selected content (e.g., "Sanctuary images"). The dialog box 240 also allows the user to select either a Send to Beach Combers button 242 to send the content to the virtual area platform 18 for association with the new Beach Combers virtual area or a Cancel button 244 to cancel the process. In response to user selection of the Send to Beach Combers button 242, the web browser component transmits the content description and links (e.g., URLs) for the selected content items to the virtual area platform 18. The virtual area platform 18 associates the selected content items with the designated virtual area and returns a specification of a notification message 246 that the web browser component displays to inform the user that the selected content has been associated with the designated virtual area. The notification message 246 also includes a control 248 for navigating the user to the designated virtual area.

Figure 12:
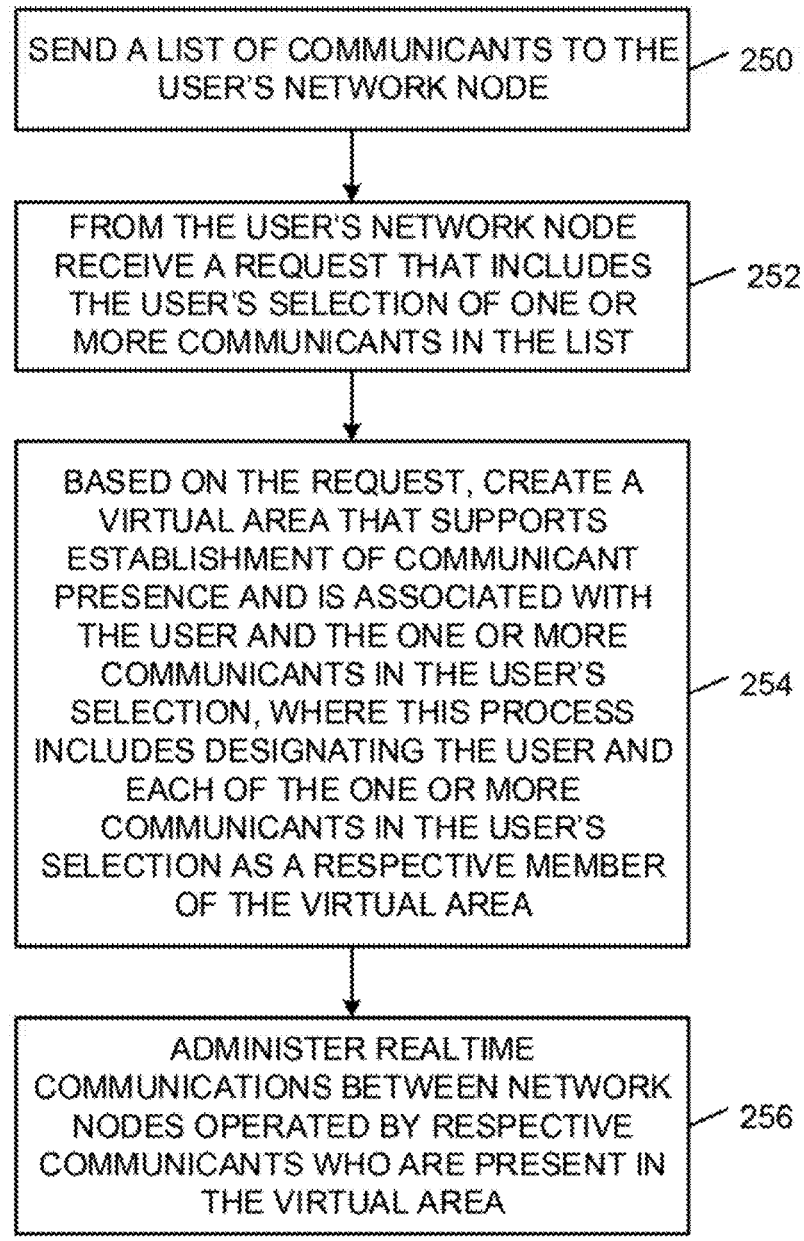
FIG. 12 is a flow diagram of an example of a context based virtual area creation method.

FIG. 12 shows an example of a method by which the virtual area platform 18 creates a virtual area based on contexts defined by people. In a network communications environment supporting realtime communications between respective network nodes of a user and other communicants, the virtual area platform 18 sends a list of communicants to the user's network node (FIG. 12, block 250). The virtual area platform 18 receives from the user's network node a request that includes the user's selection of one or more communicants in the list (FIG. 12, block 252). Based on the request, the virtual area platform 18 creates a virtual area that supports establishment of communicant presence and is associated with the user and the one or more communicants in the user's selection. In this process, the virtual area platform 18 designates the user and each of the one or more communicants in the user's selection as a respective member of the virtual area (FIG. 12, block 254). The virtual area platform 18 administers realtime communications between network nodes operated by respective communicants who are present in the virtual area (FIG. 12, block 256).

In some examples, the request includes a message. The virtual area platform sends the message to each of the one or more communicants in the user's selection. In the process of creating the virtual area, the virtual area platform 18 typically associates the message with the virtual area. In some examples, each communication includes a link (e.g., a hyperlink, such as a URL) for accessing the virtual area.

In some examples, the virtual area platform 18 sends the user a list of the user's contacts. A "contact" of a user is a communicant who is connected to the user either by an explicit social network tie that is declared by at least one of the user and the communicant (and optionally confirmed by the other) or by a social network tie that is inferred from interactions between the user and the communicant. In some embodiments, the virtual area platform 18 promotes communicant interactions based on explicit attribute values that are declared by communicants and inferred attribute values that are derived from statistical analyses of the results of queries on the relationship database 47. Each relationship type attribute value typically specifies a type of a social network tie. Exemplary relationship types include a kinship type (e.g., father-of, cousin-of), an affective type (e.g., respects, likes), a cognitive type (e.g., knows, friends-with, acquaintance-of), and social role type (e.g., teacher-of, works-with). Examples of embodiments of methods of inferring such attribute values are described in section IV of co-pending U.S. patent application Ser. No. 12/631,026, filed Dec. 4, 2009.

Figure 13:
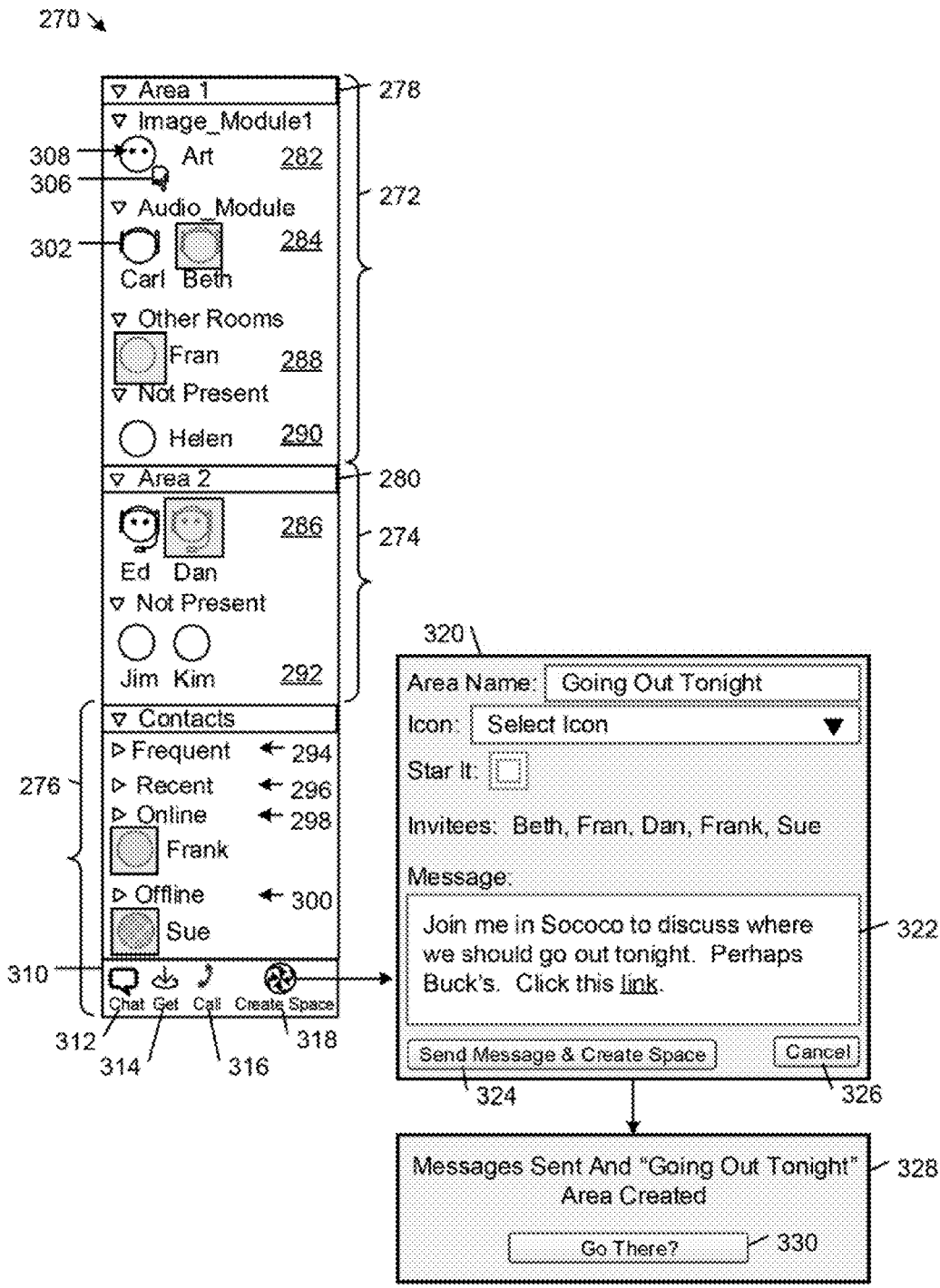
FIG. 13 is a diagrammatic view of an example of a graphical user interface.

FIG. 13 shows an example of a graphical user interface 270 that depicts the realtime availabilities and activities of some or all of the contacts of a user ("Art" in this example) across different communication contexts. The graphical user interface 270 is generated on a display of the client network node that Art is using to connect to the virtual area platform 18. The graphical user interface 270 shows Art's communicants segmented into two virtual area sections 272, 274 and a contacts section 276. The virtual area sections 272, 274 correspond to the virtual areas of which Art is a member and in which at least one of Art and Art's contacts is present, whereas the contacts section 276 contains all or a selected portion of Art's contacts that are not represented in any of the virtual area sections (e.g., Art's contacts who are not shown in any of the first and second virtual area sections 272, 274 because they either are not members of or not present in any of Area 1 and Area 2). Each of the virtual area sections 272, 274 includes a respective header bar 278, 280 that includes a descriptive label (e.g., "Area 1" and "Area 2") that is associated with the virtual area (e.g., the name of the virtual area and optionally other information relating to the virtual area, such as an announcement). Each of the sections 272, 274, 278 also includes a respective toggle control that can be toggled to selectively collapse and expand the associated section 272, 274, 278. In the illustrated example, each of the sections 272, 274, 278 is expanded.

Within each virtual area section 272, 274, the communicants who are present in the respective virtual area are grouped as follows: the communicants in the user's current zone of presence (i.e., Image_Module in this example) are displayed in a capsule 282 at the top of the section; next communicants who are co-presence with other communicants in respective zones of the respective virtual area are displayed in respective zones of co-presence capsules 284, 286; the communicants who are alone in respective zones of the virtual area are displayed in a respective "Other Rooms" capsule 288; and the communicant members of an area who currently are not present in the area are displayed in respective "Not Present" capsules 290, 292. The zones of co-presence filtering criteria identify those communicants who are co-present in respective zones of a virtual area. Thus, for each virtual area, the communicants in each group of two or more co-present communicants in the same zone of the virtual area are listed in a separate, selectively expandable and collapsible zone of co-presence capsule in a respective virtual area section of the graphical user interface 270. The depiction of the zones of co-presence enables Art to readily visualize all of the multi-communicant interactions (e.g., conversations) that are occurring across all of the communication contexts that are defined by the virtual areas of which Art is a member. In this way, Art can determine whether or not there are any ongoing multi-communicant interactions that he would like to join. In some examples, each of the capsules 282-286 for the current zone of presence and the zones of the co-presences is associated with a respective descriptive user navigable link (e.g., a URI link that includes the name of the zone and other information, such as a label that describes the topic of a meeting currently taking place in the zone).

Within the Contacts section 276, the communicants are filtered into groups according to different respective filtering criteria. These groups include a Frequent contacts group 294 in which Art's contacts are sorted by the frequency of their respective interactions with Art, a Recent contacts group 296 in which Art's contacts are sorted by the recentness of their respective interactions with Art, an Online contacts group 298 that lists all of Art's contacts who currently are online (e.g., connected to the virtual area platform 18), and an Offline contacts group 300 that lists all of Art's contacts who currently are offline (e.g., disconnected from the virtual area platform 18).

In the graphical user interface 270, each communicant is represented graphically by a respective circular sprite (or avatar) that is associated with a respective user name of the communicant (i.e., "Art," "Beth," "Carl," "Dan," "Ed," "Fran," "Helen," "Jim," "Kim," "Frank," and "Sue") and an optional status line that includes additional information about the communicant, such as location of presence (e.g., a virtual area or a zone of a virtual area); availability (e.g., busy, idle), a status message (e.g., "Out of the office next Wednesday"), and the name of the client node from which the communicant is operating (e.g., "workstation 1" or "mobile phone").

The virtual area platform 18 monitors the activities on various communication channels over which the respective communicants are configured to communicate in the virtual areas and generates state data that indicate state information about the communicants and real-time data streams (RDS) that indicate the current realtime activities of the communicants. These states and activities are represented in the graphical user interface 270 by visual cues that are depicted in association with the graphical representations of the communicants. For example, the "on" or "off" state of a communicant's local speaker channel is depicted by the presence or absence of a headphones graphic 302 on the communicant's sprite. When a communicant's speakers are on, the headphones graphic 302 is present (see sprites Carl, Ed, and Dan) and, when a communicant's speakers are off, the headphones graphic 302 is absent. The "on" or "off" state of the communicant's microphone is depicted by the presence or absence of a microphone graphic 304 on the communicant's sprite. When a communicant's microphone is on, the microphone graphic 304 is present (see sprites Ed and Dan); and, when a communicant's microphone is off, the microphone graphic 304 is absent. The headphones graphic 302 and the microphone graphic 304 provide visual cues of the on or off states of the communicant's sound playback and microphone devices. In addition, the current activity state of a communicant's microphone channel is indicated by a dynamic visualization that lightens and darkens the communicant's avatar in realtime to reflect the presence or absence of audio data on the microphone channel. Thus, whether or not their local speakers are turned on, communicants can determine when another communicant is speaking by the "blinking" of the coloration of that communicant's avatar. The activity state of a communicant's text chat channel is depicted by the presence or absence of a hand graphic 306 adjacent the communicant's sprite (see sprite Beth). Thus, when a communicant is transmitting text chat data to another network node the hand graphic 306 is present, and when a communicant is not transmitting text chat data the hand graphic 306 is not present. In some examples, the text chat RDS data reflects when keyboard keys are depressed such that the visualization of the communicant's text channel appears as a flashing on and off of the hand graphic 306. In addition, the avatars of communicants who are viewing a shared application in connection with viewscreen objects are depicted with a pair of "eyes" 308 to indicate that the represented communicants are viewing the content being shared in connection with the viewscreen props (see, e.g., the avatars of Art, Ed, and Dan).

Members of a virtual area are able to receive the state and RDS information for the communicants in the user's virtual areas of membership whether or not the user is present in the virtual area. For example, the graphical user interface 270 that is presented to Art shows visual cues indicating the states and communication channel activities of the communicants who are present in the Area virtual area (where Art is present) and the states and communication channel activities of the communicants who are present in other areas of which Art is a member but not currently present (e.g., the Area 2 virtual area).

The graphical user interface 270 includes a people interaction toolbar 310 that includes a Chat button 312, a Get button 314, a Call button 316, and a Sococo Spaces button 318 that are associated with respective interaction functionalities of the platform that operate with respect to one or more communicants associated with user-selected ones of the avatars in the graphical user interface 270.

Selection of the Chat button 312 in connection with a user-selected avatar in the graphical user interface 270 opens a chat panel that enables the user to open a private peer-to-peer zone for text chatting with the communicant corresponding to a selected one of the avatars. Selection of the Get button 358 in connection with one or more user-selected avatars in the graphical user interface 270 opens an invite window that enables the user to invite the communicants corresponding to the one or more selected avatars to a virtual area location (e.g., an area application or zone within that area application) designated by the user. Additional details regarding embodiments of the methods and functions invoked by the Chat button 360 and the Get button 358 are described in U.S. patent application Ser. No. 12/354,709, filed Jan. 15, 2009, and U.S. patent application Ser. No. 13/209,812, filed Aug. 15, 2011.

Selection of the Call button 316 opens a call window that enables the user to place a telephone call to one or more communicants, as described in U.S. patent application Ser. No. 13/165,729, filed Jun. 21, 2011. The called communicants are represented in the graphical user interface 270 by avatars that are decorated with graphical representations of a telephone.

Selection of the Sococo Spaces button 318 enables the user to create a new virtual area based on a context defined in terms of one or more of the user's contacts selected in the graphical user interface. In the illustrated example, the user has selected the avatars of Beth, Fran, Dan, Frank, and Sue, as indicated by the overlays positioned over their respective avatars. Upon selection of the Sococo Spaces button 318, the user's client network node sends to the virtual area platform 18 a request that includes profile information for the selected contacts. The virtual area platform 18 sends to the user's client network node a dialog box 320 that allows the user to set certain attributes of the new virtual area that will be wrapped around the selected contacts, including an Area Name (e.g., "Going Out Tonight") for the virtual area and an iconographic representation of the virtual area. The dialog box 320 also allowed the user to "star" the virtual area to designate the virtual area as a favorite area. The dialog box 320 lists the selected contacts as "invitees" who will be invited to the new virtual area. The dialog box 320 includes a Message box 322 that allows the user to specify a message (e.g., "Join me in Sococo to discuss where we should go out tonight. Perhaps Buck's. Click this link.") that will be sent to the selected invitees. The dialog box 320 also includes a Send Message & Create Space button 324 for initiating the virtual area creation process and a Cancel button 326 to cancel the process.

In response to user selection of the Send Message & Create Space button 324, the user's client network node transmits the new area attribute to the virtual area platform 18. The virtual area platform 18 generates a new virtual area that is associated with the selected contact invitees and the message entered in the Message box 322. The virtual area platform 18 returns a specification of a notification 328 that the user's network node displays to inform the user that messages have been sent to the selected invitees and that a virtual area has been created for the user and the selected contacts. The notification includes a control 330 for navigating the user to the newly created virtual area.

Figure 14:
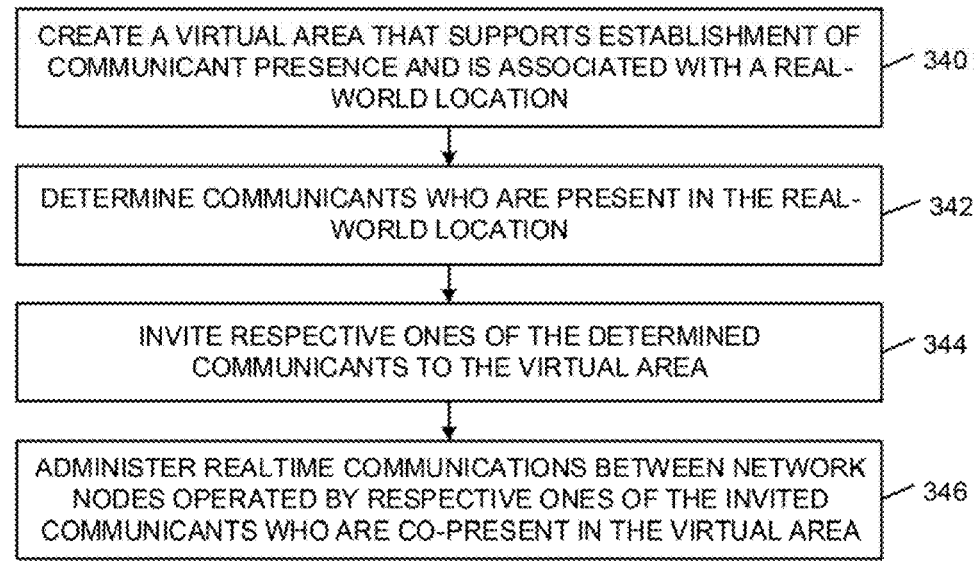
FIG. 14 is a flow diagram of an example of a context based virtual area creation method.

FIG. 14 shows an example of a method by which the virtual area platform 18 creates a virtual area based on contexts defined by real-world location. In a network communications environment supporting realtime communications between respective network nodes of a user and other communicants, the virtual area platform 18 creates a virtual area that supports establishment of communicant presence and is associated with a real-world location (FIG. 14, block 340). The virtual area platform 18 determines communicants who are present in the real-world location (FIG. 14, block 342). The virtual area platform 18 invites respective ones of the determined communicants to the virtual area (FIG. 14, block 344). The virtual area platform 18 administers realtime communications between network nodes operated by respective one of the invited communicants who are co-present in the virtual area (FIG. 14, block 346).

In some examples, the virtual area platform 18 creates the virtual area based on a request received from a user's network node in connection with real-world location. In some examples, the location data describes a real-world location of the user's network node (e.g., real-world coordinates generated by a Global Positioning System (GPS) service, a Global System for Mobile Communications (GSM) service, or other location-based service, associated with the user's network node) or some other real-world location. The real-world location that is associated with the virtual area may be fixed or may change over time. An example of a fixed real-world location that might be associated with the virtual area is the location of a stationary object, such as a building or other physical structure (e.g., one or more structures associated with a commercial establishment). An example of changing real-world locations that might be associated with the virtual area is the current real-world location of the user.

In some examples, the virtual area platform 18 automatically invites all of the communicants who are determined to be present in the real-world location to the virtual area. In other examples, the virtual area platform 18 presents a list of the determined communicants to the user and allows the user to select which of the determined communicants to invite to the virtual area.

In some examples, the virtual area platform 18 creates the virtual area based on a determination that the real-world coordinates of one or more of the communicants satisfy a location-based predicate.

Figures 15A, 15B:
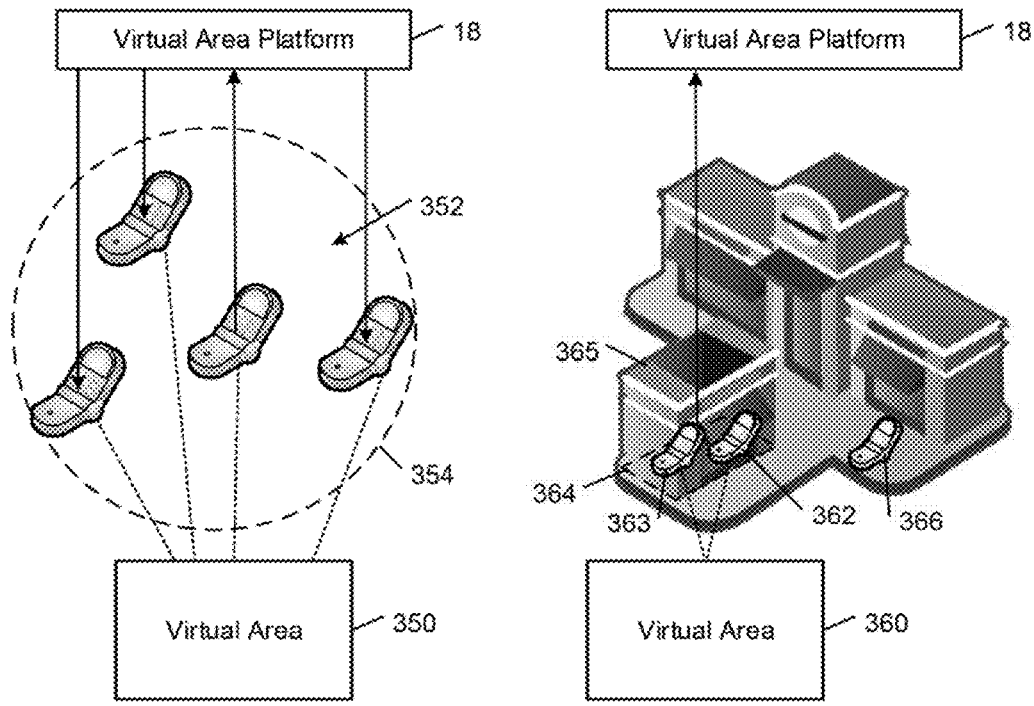
FIGS. 15A-15B are diagrammatic view of examples of network communications environments.

Referring to FIG. 15A, in some examples, the virtual area platform 18 automatically creates a virtual area in response to a determination that the real-world locations of two or more communicants satisfy a proximity predicate (e.g., the communicants are within a particular distance from one another) and an optional time predicate (e.g., the communicants must satisfy the proximity predicated for at least a threshold length of time). In the illustrated example, the virtual area platform 18 automatically creates a virtual area 350 for communicants operating respective network nodes 352 whose locations can be circumscribed by a virtual circular boundary 354 with a diameter of at most a specified threshold diameter (e.g., three meters). In other examples, the virtual area platform 18 automatically creates a virtual area for communicants in response to a determination that their respective network nodes are located within a specified distance of a target one of the network nodes 352.

Referring to FIG. 15B, in some examples, the virtual area platform 18 automatically creates a virtual area in response to a determination that a communicant's network node is located within a designated real-world space. In the illustrated example, the virtual area platform 18 automatically creates a virtual area 360 for communicants who are operating respective network nodes (e.g., mobile phones 362, 363) whose locations are within a specified real-world coordinate boundary 364 within a building 365, but does not create such a virtual area for communicants whose network nodes (e.g., mobile phone 366) are located outside the real-world coordinate boundary 364. In some examples, the virtual area platform 18 conditions the creation of the virtual area 360 on there being at least two co-present communicants within the real-world coordinate boundary 364 (e.g., communicants who are located within the real-world coordinate boundary) and optionally for a period of at least a threshold length of time (e.g., one minute).

Figure 16:
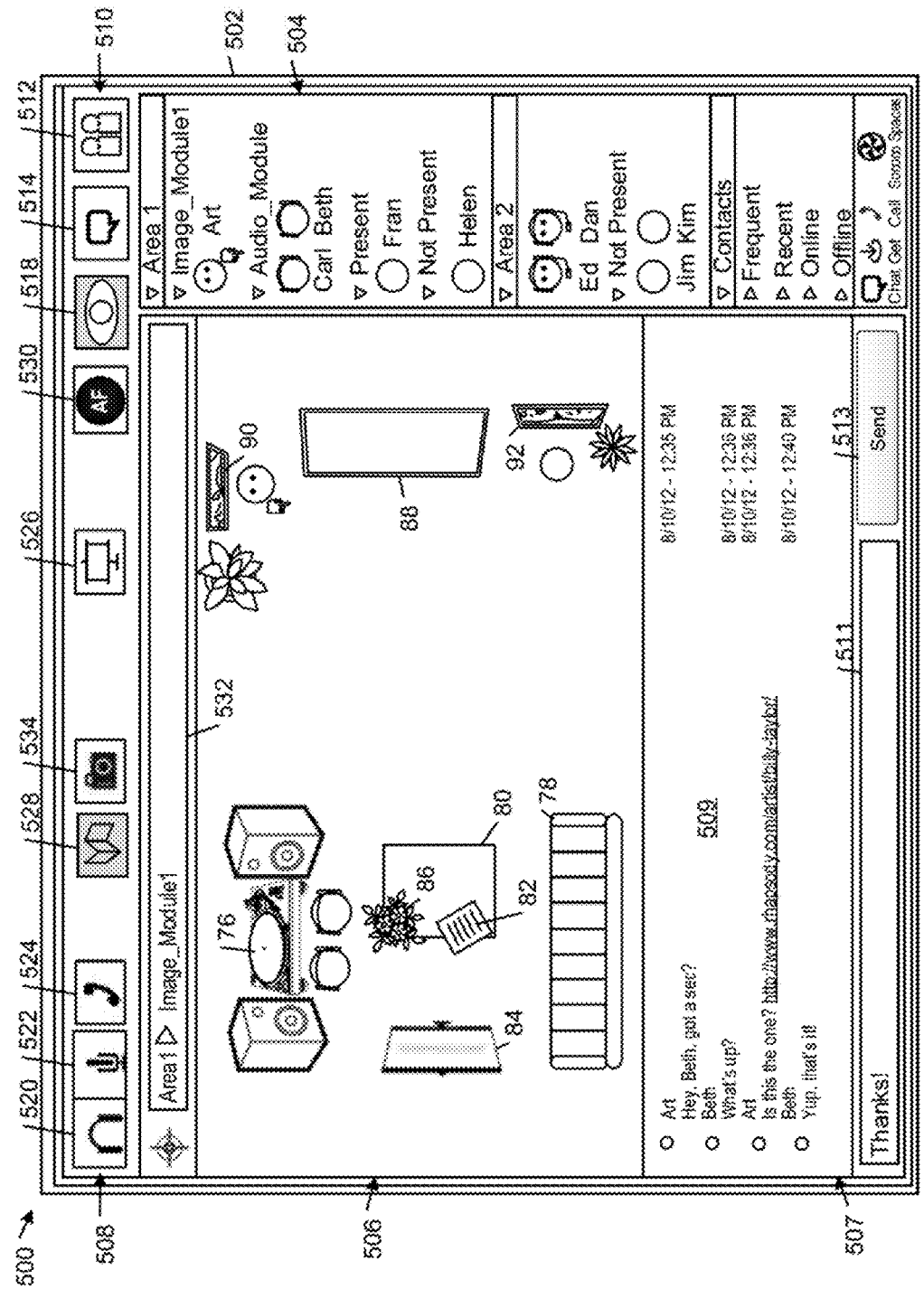
FIG. 16 is a diagrammatic view of an example of a graphical user interface.

FIG. 16 shows an exemplary graphical user interface 500 that is generated by an example of the communications application 26 in a window 502 on a display of the client network node from which a user of the client application ("Art" in this example) is operating. The graphical user interface 500 includes a people panel 504, a viewer panel 506, a chat panel 507, an audio interaction toolbar 508, and a set of panel view controls 510. The panel view controls 510 include a people panel button 512 for opening and closing the people panel 504, a Chat panel button 514 for opening and closing the chat panel 507, and a viewer panel button 518 for opening and closing the viewer panel 506.

The people panel 504 contains an example of the graphical user interface 270 (see FIG. 13), which shows the realtime availabilities and activities of some or all of Art's contacts across different communication contexts.

As explained in detail below, the viewer panel 506 presents different visual information depending on the viewer panel controls that have been selected by the user.

The chat panel 507 shows a chat interface for a persistent virtual chat area for interactions occurring in connection with a respective virtual area. The chat interface of the chat panel 507 includes a chat log area 509, a text box 511, and a Send button 513. The user may enter text messages in the text box 511 and transmit the text messages to the other communicants who are in Area 1 by selecting the Send button 513. In the example shown in FIG. 16, Art activated the chat panel button 507 at the time he was present in the Image_Module1 zone of the Area 1 virtual area (see virtual area 60 in FIG. 5); therefore, the chat log area 509 shows the persistent virtual chat history for text chat interactions occurring in connection with Area 1. The chat log area 509 also displays a log of events that are associated with Area 1. An exemplary set of events that may be displayed in the chat log area 242 include: text messages that the user has exchanged with other communicants in the zone; changes in the presence status of communicants in the zone; changes in the speaker and microphone settings of the communicants in the zone; and the status of the props (discussed below), including references to any applications and data files that are shared in connection with the props. In the illustrated example, the events are labeled by the communicant's name followed by content associated with the event (e.g., a text message) or a description of the event.

The audio interaction toolbar 508 includes a headphone control 520 that enables Art to toggle on and off the local speakers of the client network node, and a microphone control 522 that enables Art to toggle on and off the local microphone of the client network node.

The graphical user interface 500 also includes a Phone button 524, a respective Viewscreen button 526 for each viewscreen in the user's current zone of presence, a Map button 528, and an Activity Feed (AF) button 530. The Phone button 524 is associated with telephony related functionality of the platform that enables a user of a Public Switched Telephone Network (PSTN) terminal device to participate in virtual area based communications (e.g., by the PSTN terminal device user calling into a zone of the virtual area or by a user of the communications application 26 to call out to the PSTN terminal device user), as described in U.S. patent application Ser. No. 13/165,729, filed Jun. 21, 2011. The Viewscreen button 526 sets the viewer panel 506 to display the content the content being shared in connection with the corresponding viewscreen object 84 in the current zone of presence or, if no content is being shared in connection with the current viewscreen object 84, to display a Share button that allows the user to initiate a screen sharing session in connection with the selected viewscreen object. The Map button 528 sets the view presented in the viewer panel 506 to a map view of the virtual area in which the user either is present or lurking. The Activity Feed button 530 opens an Activity Feed panel for visualizing published activities and other events relating to virtual areas of interest to the user.

In the example shown in FIG. 16, the Map button 528 is selected, which places the viewer panel 506 into the map view mode. Consequently, the viewer panel 506 shows a spatial visualization of the area or area/zone in which the user currently is present; namely, the Image_Module1 zone of Area 1 as indicated in the location bar 532 by the address "Area1/Image_Module1." The user can move to a different zone of the virtual area either by selecting the graphical representation of the zone in the spatial representation shown in the viewer panel 506.

In some examples, the virtual area platform 18 automatically associates zones with application-specific rendering modules (also referred to as plugins) that are needed to render content associated with the zones of the virtual area. Examples of such rendering modules include viewscreen modules, audio player modules, video player modules, and image modules. A viewscreen module provides functionality and an interface for web browser and application sharing. An audio player module provides functionality and an interface for audio playback. A video player module provides functionality and an interface for video playback. An image module provides functionality and an interface for image playback. Each of the rendering modules is associated with a respective context-dependent button that automatically is presented in the interface when the user's current state allows the user to interact with particular content.

In the example shown in FIG. 16, the user is present in the Image_Module1 zone of Area 1, which is associated with image content (e.g., images that have been associated with Area 1, or images available from an image sourcing web service, such as an image sharing web service, that have been associated with Area 1). Thus, when the user is present in the Image_Module1 zone, the graphical user interface 500 includes an image module button 534 that is associated with functionality and an interface for image playback.

Figure 17:
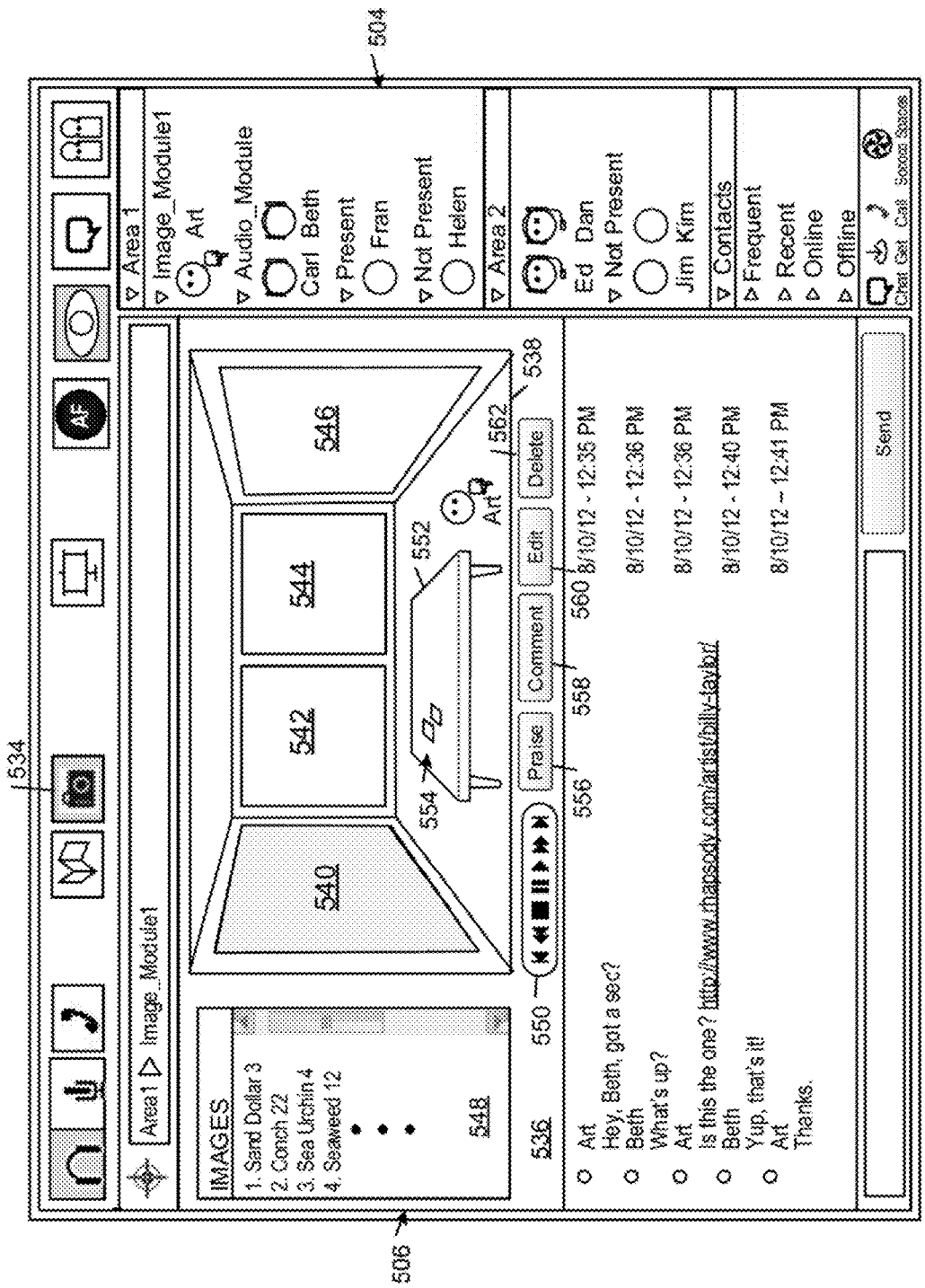
FIG. 17 is a diagrammatic view of an example of a graphical user interface.

Referring to FIG. 17, when the user selects the image module button 534, the viewer panel 506 switches from the map view of Area 1 to an image playback interface 536 that is generated by the image playback module designated for handling image playback by the virtual area platform 18. In this example, the image playback interface 536 includes a display area 538 that has four display screens 540, 542, 544, 546 for displaying images that have been associated with Area 1 and are listed in an image list 548. The user can drag and drop images from the image list 548 to respective ones of the display screens 540-546, each of which may be associated with a respective category or group label (e.g., a favorites group or other category). The user can select one of the display screens 540-546 (e.g., the highlighted display screen 540) and scroll through images allocated to the selected display screen either as an automated slide show or manually using a set of playback controls 550. The user can set aside images for a particular purpose by dragging images from the image list 548 or the display screens 540-546 and dropping them onto a table object 552, where they are represented graphically by respective image objects 554. The image playback interface 536 includes a Praise control 556 for submitting an indication of praise (or like) for a selected image, a Comment control 558 for submitting a comment in connection with a selected image, an Edit control 560 for accessing tools for editing a selected image, and a Delete control 562 for deleting a selected image.

Figure 18:
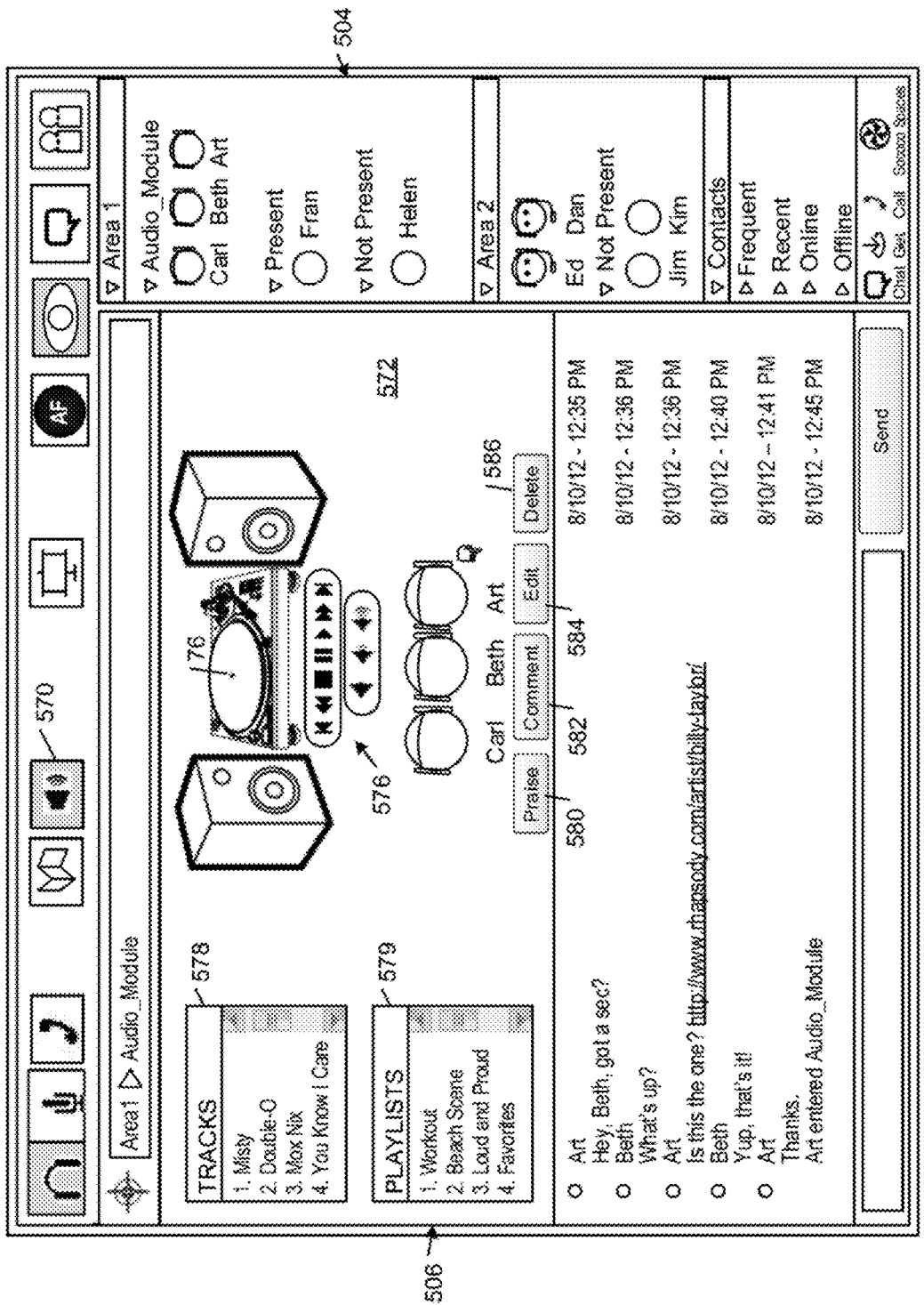
FIG. 18 is a diagrammatic view of an example of a graphical user interface.

In the example shown in FIG. 18, the user has moved to the Audio_Module zone of the Area 1 virtual area, which is associated with audio content (e.g., musical tracks and other audio files that members have associated with Area 1, or audio tracks available from an image sourcing web services, such as a music sharing web service, that have been associated with Area 1). When the user is present in the Audio_Module zone, the graphical user interface 500 includes an audio module button 570 that is associated with functionality and an interface for audio playback. When the user selects the audio module button 570, the viewer panel 506 switches from the map view of Area 1 to an audio playback interface 572 that is generated by the audio playback module designated for handling audio playback by the virtual area platform 18. In this example, the audio playback interface 572 includes the sound system object 76 and associated audio controls 576 for controlling playback of audio tracks listed in a tracks list 578 or playlists listed in a playlists list 579. The user can playback the tracks or playlists in the order in which they are listed in the tracks list 578 or playlists list 579 or drag and drop individual audio tracks or playlists from the tracks list 578 or playlists list 579 to the sound system object 76 for immediate playback. The image playback interface 572 includes a Praise control 580 for submitting an indication of praise (or like) for a selected image, a Comment control 582 for submitting a comment in connection with a selected image, an Edit control 584 for accessing tools for editing a selected audio track, and a Delete control 590 for deleting a selected audio track.

Figure 19:
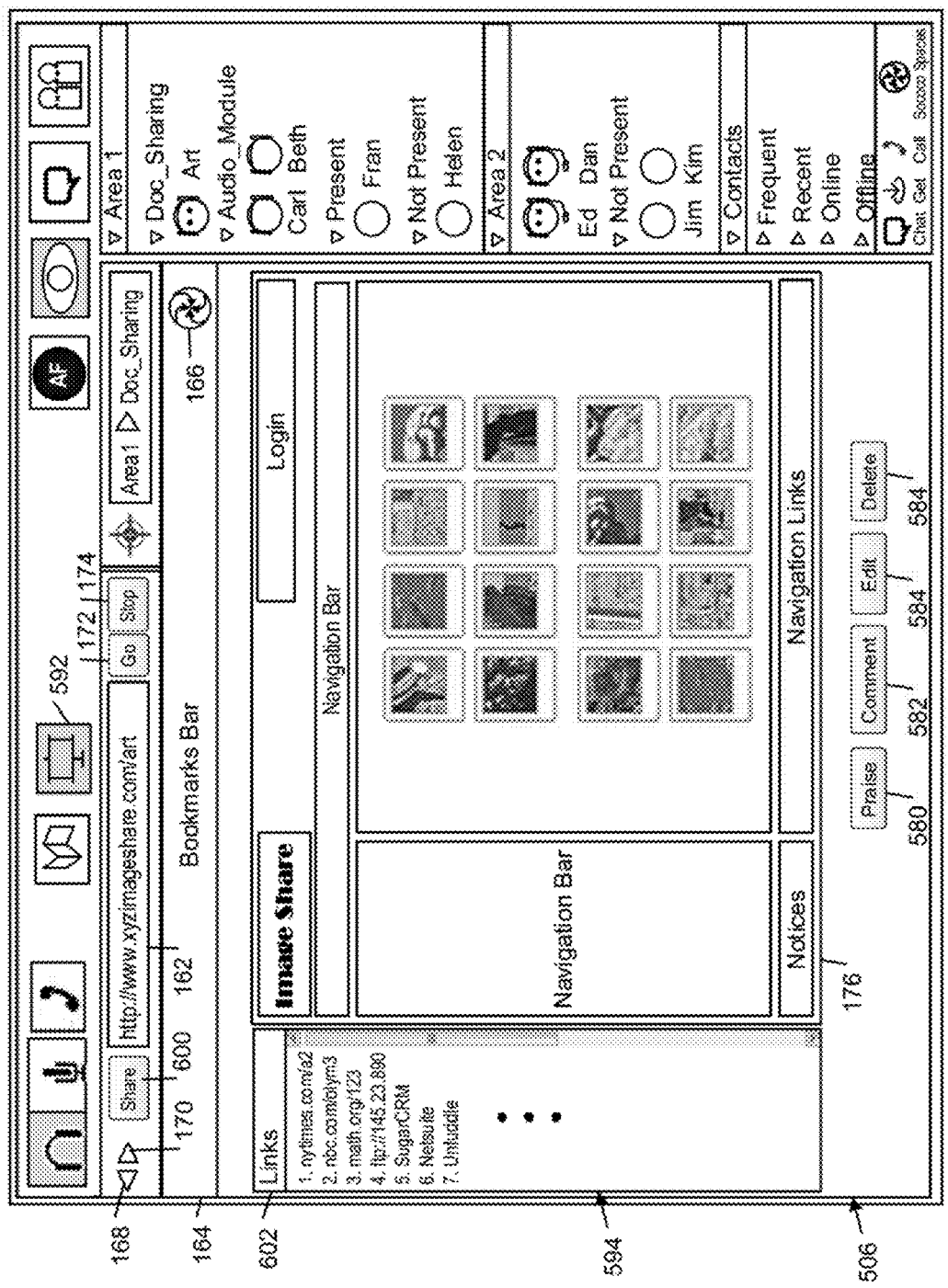
FIG. 19 is a diagrammatic view of an example of a graphical user interface.

In the example shown in FIG. 19, the user has moved to the document sharing zone of the Area 1 virtual area, which is associated with document content (e.g., web pages, desktop publishing documents, and other documents that have been associated with Area 1). When the user is present in the document sharing zone, the graphical user interface 500 includes a viewscreen button 592 that is associated with application sharing functionality and an interface for sharing documents among co-present communicants in Area 1. When the user selects the viewscreen button 592, the viewer panel 506 switches from the map view of Area 1 to a document browsing interface 594 that is generated by a module designated for handling application sharing by the virtual area platform 18. The document browsing interface 592 includes elements of the web browser interface 160 sown in FIG. 8, including the address bar 162, the bookmarks bar 164, the Sococo Spaces button 166, the back and forward navigation buttons 168, 170, the Go button 172, the Stop button 174, and the main browser panel 176. The document browsing interface additionally includes a Share button 600 that initiates a screen share of the contents of the display area of the viewer panel 506 in connection with the viewscreen object 84 in Area 1. These contents include, for example, renderings of any information that is received by the browser component in connection with the network resource identified in the location bar 162, and a document or application that is being shared by the user in connection with a viewscreen object in the user's current location of presence (e.g., the viewscreen object 84 in the document sharing zone of Area 1).

The application sharing functionality is invoked by activating the viewscreen object 84 (e.g., by single-clicking the viewscreen object with an input device). In some embodiments, the platform provides visual cues that indicate whether or not a communicant is sharing an application over an application sharing channel. In response to a communicant's selection of the viewscreen object 84, the communicant's sprite automatically is moved to a position in the graphical representation of the virtual area that is adjacent the viewscreen object 84. The position of a communicant's sprite adjacent the viewscreen object 84 indicates that the communicant currently is sharing or is about to share an application with the other communicants in the virtual area. In addition, the avatar of each communicant who is viewing a shared application (including the sharing communicant) is depicted with a pair of "eyes" to indicate that the represented communicants are viewing the content being shared in connection with the viewscreen objects. The graphical depiction of viewscreen object 84 is changed depending on whether or not an active application sharing session is occurring. For example, the depicted color of the viewscreen object 84 may change from a brighter color during an active application sharing session to a darker color when there is no application sharing taking place.

The viewscreen object 84 may be associated with links 602 to one or more documents or document serving network resources, such as a network accessible service (i.e., Sugar-CRM, Netsuite, and Unfuddle), that have been associated with the virtual area. Each of the network accessible services is associated with a respective URI link (i.e., http://www-.sugarcrm.com, http://www.netsuite.com, and http://www.unfuddle.com). The documents and services that are associated with the viewscreen object 84 are accessed by the browser components on the client network nodes of the communicants who currently are screen sharing in connection with the viewscreen object 84. In this regard, the contents of network resources shared by the communicant currently in charge of running viewscreen objects (i.e., the moderators who might be, e.g., the communicant who initially activated the viewscreen object 84) automatically are captured from these communicants' client network node and sent to the other communicants who subscribed to the application sharing channel by activating the viewscreen object 84. In this way, all of the communicants in the document sharing zone 66 can collaborate together in the context of the network resource interactions of the moderator in connection with the linked services. In these examples, all the communicants who activate the same viewscreen object will see the same network resource contents via screen sharing.

The virtual area platform 18 generates summaries of activities and other events in virtual areas and publishes those summaries to other communicants in realtime so that the other communicants readily can discern what's happening in different potentially relevant contexts and decide whether or not to join or otherwise participate in those contexts. The published summaries may be available to all communicants (i.e., publicly available), only those communicants who are socially related to the activity participants or the members of the virtual area (e.g., friends or friends-of-friends), or only members of the virtual area (i.e., private).

Figure 20:
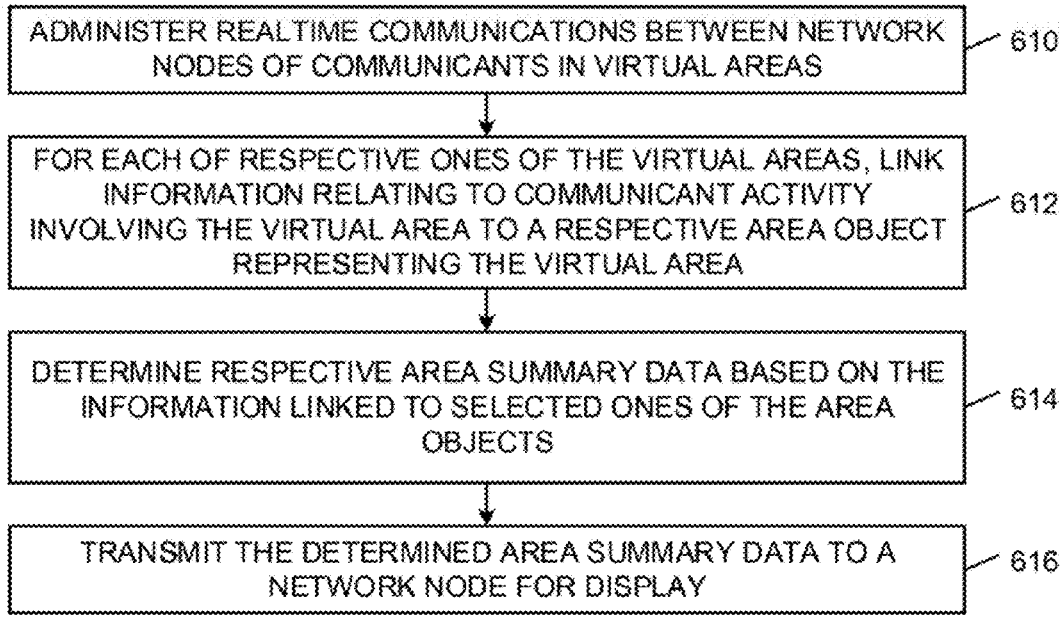
FIG. 20 is a flow diagram of an example of a method that involves publishing area activity summaries.

FIG. 20 shows an example of a method by which the virtual area platform 18 administers the creation and publication of area activity summaries. In accordance with this method, the virtual area platform 18 administers realtime communications between network nodes of communicants in virtual areas (FIG. 19, block 610). For each of respective ones of the virtual areas, the virtual area platform 18 links information relating to communicant activity involving the virtual area to a respective area object representing the virtual area (FIG. 19, block 612). The virtual area platform 18 determines respective area activity summary data based on the information linked to selected ones of the area objects (FIG. 19, block 614). The virtual area platform 18 transmits the determined area activity summary data to a network node for display (FIG. 19, block 616).

The virtual area platform 18 may determine the area activity summary data for the selected areas in different ways. In some examples, the virtual area platform 18 extracts area activity summary data based on queries on the area objects representing the virtual areas. These queries may be predefined or custom queries received from communicants. In some examples, the virtual area platform 18 uses a set of predefined queries to determine area activity summary data at different respective levels of detail (e.g., summary label and area activity summary status only; summary label, summary status, and communicant list; and summary label, summary status, communicant list, and notes with the interaction or event that is the subject of the summary).

The published area activity summaries may be available to all communicants, only those communicants who are socially related to the activity participants or the members of the respective virtual areas (e.g., friends or friends-of-friends), or only members of the respective virtual areas. In some examples, the process of selecting the area activity summaries to publish involves querying the target communicants' respective social graphs. In other examples, the virtual area platform 18 publishes respective sets of area activity summaries to client network nodes based on search queries received from a client network nodes. The virtual area platform 18 may select all or a filtered set of the area activity summaries to transmit/publish to a client network node. The filter criteria may be, for example, one or more conditions on any type of area object attribute including, for example, a time attribute value, a virtual location attribute value, a communicant attribute value, and a data type attribute value. In some examples, the virtual area platform 18 ranks area activity summaries, and selects highest ranked ones of the ranked area activity summaries. In some examples, for each of the area activity summaries, the ranking is based on at least one of: a count of communicants involved in the respective area activity summary; a count of follow-up tasks associated with the respective area activity summary; and one or more approval ratings associated with the respective area activity summary.

In some examples, the virtual area platform 18 determines a time-based ordering of the area activity summary data, from a starting area activity summary to an ending area activity summary. The starting area activity summary may be the first area activity summary in a time-based ordering of the area activity summaries and the ending area activity summary may be the last area activity summary in the time-based ordering. The area activity summaries may be ordered chronologically or reverse chronologically according to a time attribute value (e.g., start time or end time) associated with the area activity summary. The virtual area platform 18 typically transmits to one or more of the network nodes a respective specification (e.g., an XML specification) of a view for displaying the area activity summary data in accordance with the time-based ordering.

In some examples, the virtual area platform 18 transmits an activity view of the respective area objects to the network node, where the activity view shows a time-based listing of respective area activity summaries for all concurrent and consecutive ones of the area activities from a starting one of the area activities to an ending one of the area activities. In some examples, the virtual area platform 18 transmits a timeline view of the respective area activity summaries to the network node, where the timeline view shows a time-based listing of respective area activity summaries for highest ranked ones of the area activities.

The virtual area platform 18 also typically transmits updates to the requesting ones of the client nodes to reflect changes to existing area activities and new area activities.

In some examples, the virtual area platform 19 sends to each of one or more of the communicants who were involved in a particular one of the area activities a respective follow-up message comprising information relating to the particular area activity. In some examples, the respective message includes one or more of: a summary of the particular area activity; a note associated with the particular area activity; a follow-up task associated with the particular area activity; and an indication of submitted evaluations of the particular area activity.

Figure 21:
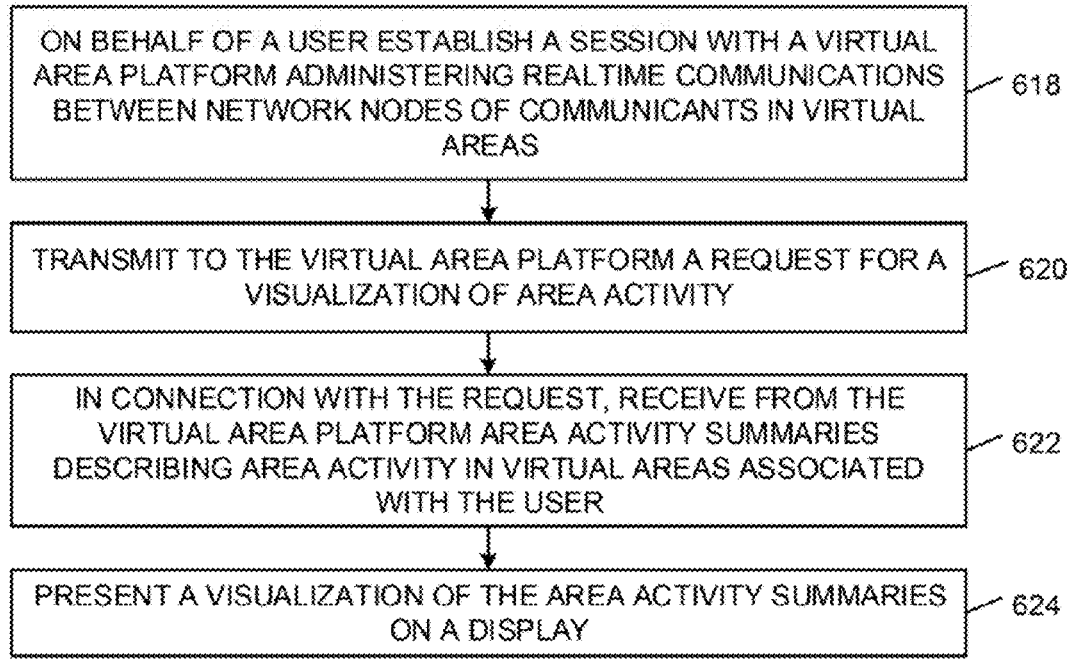
FIG. 21 is a flow diagram of an example of a method that involves displaying area activity summaries.

FIG. 21 shows an example of a method by which a client network node interacts with the server network node 40 in the process of presenting a visualization of one or more ongoing or completed area activities. In accordance with this method, the client network node establishes a session with a virtual area platform that administers realtime communications between network nodes of communicants in a virtual area (FIG. 21, block 618). The client network node transmits to the virtual area platform a request for a visualization of area activity (FIG. 21, block 620). In connection with the request, the client network node receives from the virtual area platform area activity summaries describing area activity in virtual areas associated with the user (FIG. 21, block 622). The client network node presents a visualization of the area activity summaries on a display (FIG. 21, block 624).

In some examples, the client network node receives area activity summaries of virtual areas of which the user is a member. In other examples, the client network node receives area activity summaries of virtual areas that are associated with the user through the user's social ties with the activity participants or the members of the respective virtual areas (e.g., friends or friends-of-friends). In some examples, the client network node receives publicly available area activity summaries that are associated with the user through the user's membership in the virtual area platform service.

In some examples, the client network node presents an activity view of the received area activity summaries. In some of these examples, the activity view shows a time-based listing of area activity summaries of all concurrent and consecutive area activities from a starting one of the area activities to an ending one of the area activities. The starting and ending area activities may correspond to the first and last area activities that satisfy certain filtering criteria (e.g., one or more time, virtual location, and communicant parameter values).

In some examples, the client network node presents a timeline view of the received area activity summaries. In some of these examples, the timeline view shows a time-based listing of area activity summaries of highest ranked ones of the area activities of copresent communicants.

The virtual area platform 18 may rank the area activities in a variety of different ways. In some examples, the virtual area platform 18 ranks area activities based on a score derived from a weighted combination of one or more attributes of the area activities. Examples of such attributes include:

the number of participants in the activities (e.g., activities with a greater number of participants may be scored higher than activities with fewer participants);

the roles of the activity participants (e.g., activities with participants with particular roles, such as chief executive office, dungeon master, or movie critic may be scored higher than other activities);

the duration of the activity (e.g., longer activities may be scored higher than shorter activities);

the interaction level during the activity (e.g., activities with higher amounts of audio, video, screen share, text chat, and file share interaction may be scored higher than activities with lower amounts of such interaction);

the amount of data associated with the activity (e.g., activities with more notes and follow-up tasks may be scored higher than assemblies with fewer notes and follow-up tasks);

the amount of feedback received in connection with the activity (e.g., activities that receive more comments or praise may be scored higher than activities that receive less feedback);

the quality of feedback received in connection with the activity (e.g., activities that receive more praise or less negative feedback may be scored higher than activities that receive less praise or more negative feedback); and the association of certain keywords with activities (e.g., activities associated with keywords—e.g., "important", "critical", and the like—in the label, notes, or chat history may be scored higher than activities that are not associated with such keywords).

In some examples, for each of respective ones of the area activity summaries, the client network node provides a respective control for submitting feedback regarding the respective area activity. Responsive to receipt of feedback in connection with a respective one of the controls associated with a given one of the area activity summaries, the client network node submits to the API server 432 a message that includes the feedback received in connection with the given area activity. In some of these examples, the feedback may be a comment or an opinion (e.g., an indication of "praise" or "like") on the merits of the respective assembly.

In some examples, the client network node presents in connection with each of respective ones of the area activity summaries at least one of: a respective area activity label; a respective area activity status indication; and a respective link to data associated with the respective area activity summary. In some examples, the client network node presents a respective link to notes or follow-up tasks associated with a respective area activity.

In some examples, the client network node provides an interface for specifying a search for area activity summaries of respective area activities in terms of one or more: communicants present during the respective area activities; one or more zones of the virtual area in which the respective area activities occurred; and a time overlapping with occurrence of the respective area activities.

In some examples, the client network node displays a visualization of a virtual area together with the visualization of the area activity summaries. In these examples, the client network node typically depicts graphical representations of respective communicants who are present in the virtual area. The client network node also typically provides interaction controls for managing realtime communications with one or more of the communicants in the virtual area. In some examples, the virtual area includes zones each of which supports establishment of respective presences of communicants operating respective client network nodes, and the area activities occur in respective ones of the zones. In some of these examples, the visualization of the virtual area includes a spatial arrangement of graphical depictions of the zones and the graphical representations of communicants are shown in respective ones of the graphical depictions of the zones.

Figure 22A:
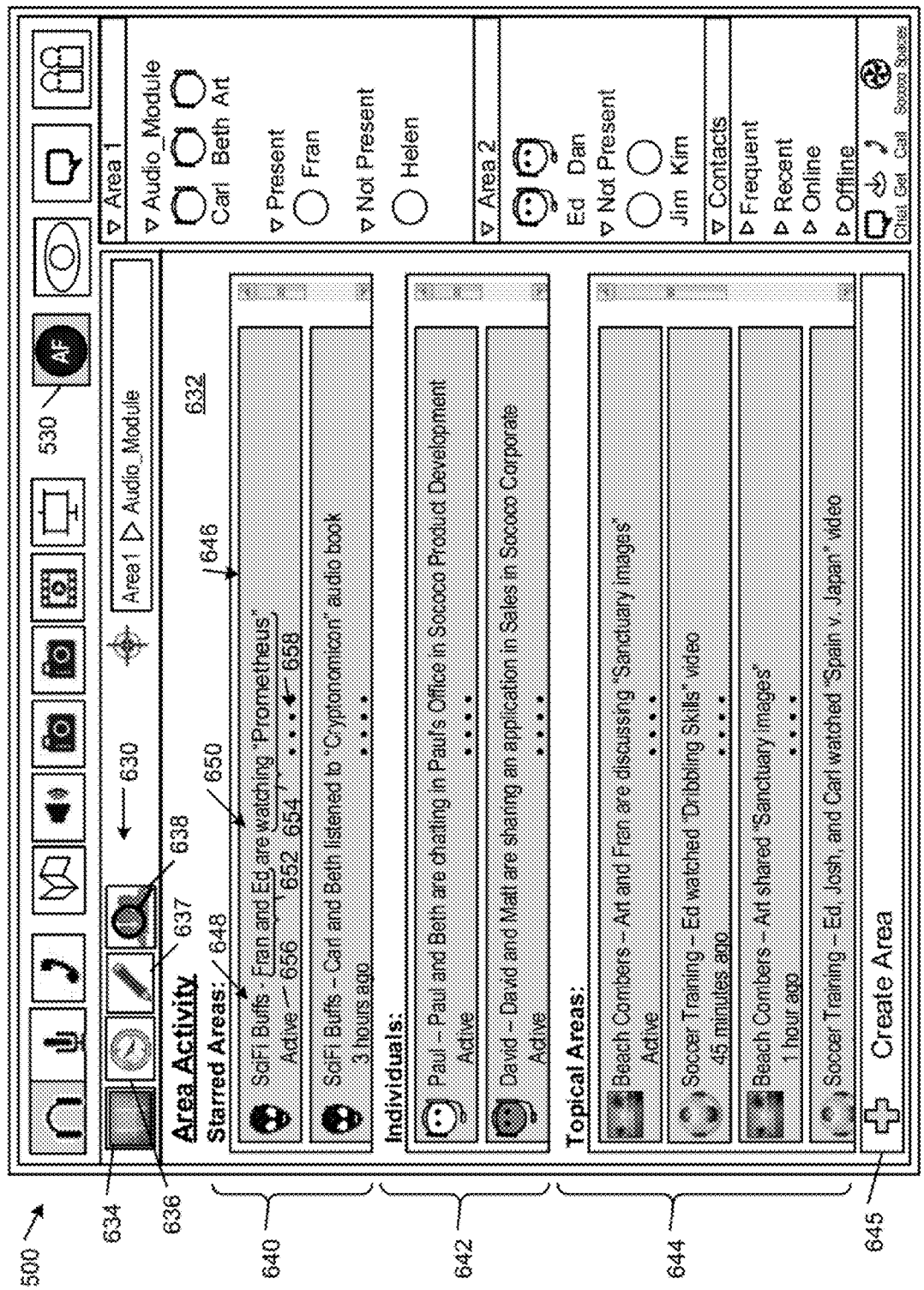
FIGS. 22A-22B are diagrammatic views of an example of a graphical user interface.

FIG. 22A shows an example of the graphical user interface 500 after the user has selected the Activity Feed button 530, which caused the communications application 26 to retrieve from the virtual area platform 18 the Sococo Spaces application web interface (referred to as the "area activity interface") that includes an activity visualization toolbar 630 and an activity feed section 632 and to render that web interface in the viewer panel of the graphical user interface 500.

The activity visualization toolbar 630 includes an activity view control 634, a timeline view control 636, an area edit control 637, and a search control 638. The activity view control 634 directs the browser component 428 (FIG. 7A) to request an area activity view on the area object data from the API server 432 (FIG. 7A) and to present that view in the activity feed section 632 of the area activity interface. The timeline view control 636 directs the browser component 428 to request an area activity view on the area object data from the API server 432 and to present that view in the activity feed section 632 of the area activity interface. The area edit control 637 directs the browser component 428 to bring up in the viewer panel an area edit interface that allows the user (assuming the user's has the required capability) to edit one or more attributes of a virtual area (e.g., a virtual area linked to a selected one of the area activity summaries, or a virtual area in which the user is present). The search control 638 directs the browser component 428 to render in the viewer panel of the graphical user interface 500 a search interface that enables the user to submit searches on any data associated with the area objects, including virtual place, communicants, time, keywords, and content type.

The area activity interface includes a Starred Areas section 640, an Individuals section 642, and a Topical Areas section 644 that correspond to different respective views on the area object data. The Starred Areas section 640 contains area activity summaries relating to virtual areas that the user has indicated as being favorite areas by starring them (see, e.g., FIG. 11B). The Individuals section 642 contains area activity summaries relating to particular individuals whose activity summaries were designated by the user for inclusion in the Individuals section 642. The Topical Areas section 644 contains other area activity summaries that are associated with the user (e.g., through membership or social network ties).

The area activity interface additionally includes a Create Area control 645 that brings up an interface for submitting a request for the virtual area platform 18 to create a new virtual area. The Create Area request may include an interface of the type shown in FIG. 11B that allows the user to name the virtual area and invite one or more contacts to the virtual area.

In the example shown in FIG. 22A, the user has activated the activity view control 634. In response to this selection, the browser component 428 generates an activity view that shows in each section 640, 642, 644 a respective list of summaries 646 of all ongoing and completed activities in the virtual areas associated with the user. In the activity view example shown in FIG. 22A, the summaries 646 are presented at a relatively low level of detail that allows the user to quickly determine a few essential features of each area activity. In particular, each summary 646 shows a respective label 648 (e.g., "SciFi Buffs"), an activity description 650 that includes a list 652 of at least some of the activity participants (e.g., "Fran and Ed") and an indication 654 of the type of activity (e.g., "watching Prometheus"), and a status indicator 656 (e.g., "Active"). The virtual area platform 18 typically generates the area labels 648, the activity descriptions 650, and the status indicators 656 automatically from the data associated with the respective area objects.

Figure 22B:
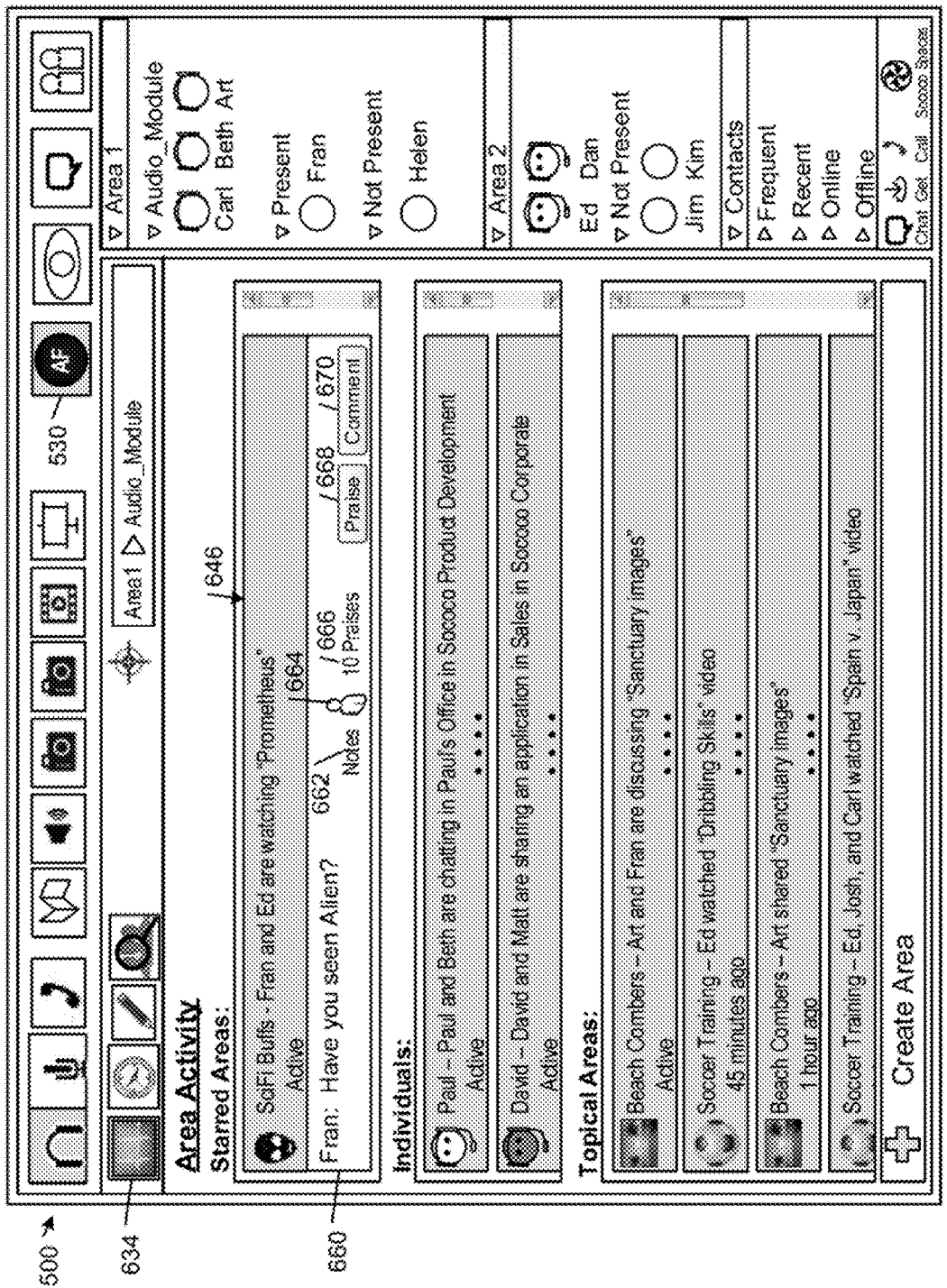

Each summary 646 also includes a hidden collapsible content area that contains additional details regarding the respective assembly. Selecting a respective ellipsis control 658 reveals the hidden content area. FIG. 22B shows an example of a collapsible content area 660 that is revealed in response to user selection of the ellipsis control 658 for the top area activity summary shown the activity view of FIG. 22A. In the illustrated example, the collapsible content area 660 includes the most recent portion of the chat history that is associated with the respective area activity (i.e., "Fran: Have you seen Alien?"), a link 662 that brings up a notes interface for creating, reading, updating, or deleting notes that are associated with the respective area activity, a link 664 that brings up a contacts interface for seeing the status of or communicating with one or more of the participants of the respective area activity, and an indication 666 of the number of praises that are associated with the respective area activity. The collapsible content area 660 also includes a praise control 668 for submitting an indication of praise (or like) for the respective area activity and a comment control 670 for submitting a comment in connection with the respective area activity.

Figure 23:
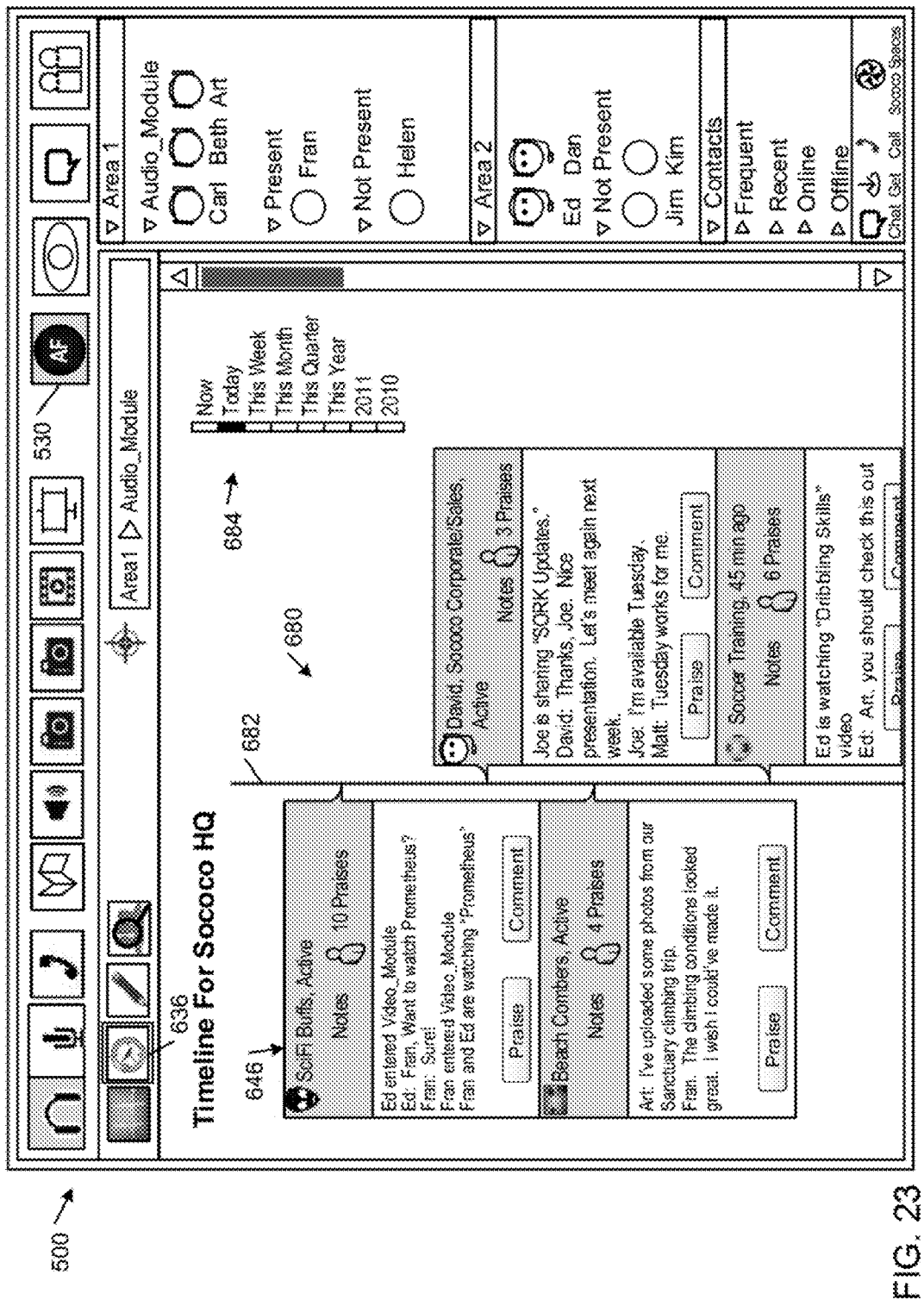
FIG. 23 is a diagrammatic view of an example of a graphical user interface.

FIG. 23 shows an example of a timeline view that the browser component 428 generates in the viewer panel of the graphical user interface 500 in response to the user activation of the timeline view control 636. In this example, the timeline view shows a selection 680 of the area activity summaries 646 for the area activities in a user-selected time period that are highest in rank. In the timeline view example shown in FIG. 23, the summaries 646 are presented at the level of detail shown in FIG. 23, in which the collapsible content areas are revealed. The summaries 646 in the selection 680 are arranged in chronological order on either side of a timeline 682. The timeline view includes a control 684 that allows the user to select the desired time period. In the illustrated example, the user has selected "today" as the time period, in which case the timeline view shows summaries for the highest ranked ongoing and completed area activities that occurred today. The timeline view allows users to quickly find the summaries for key assemblies that occurred during the selected time period.

Figure 24:
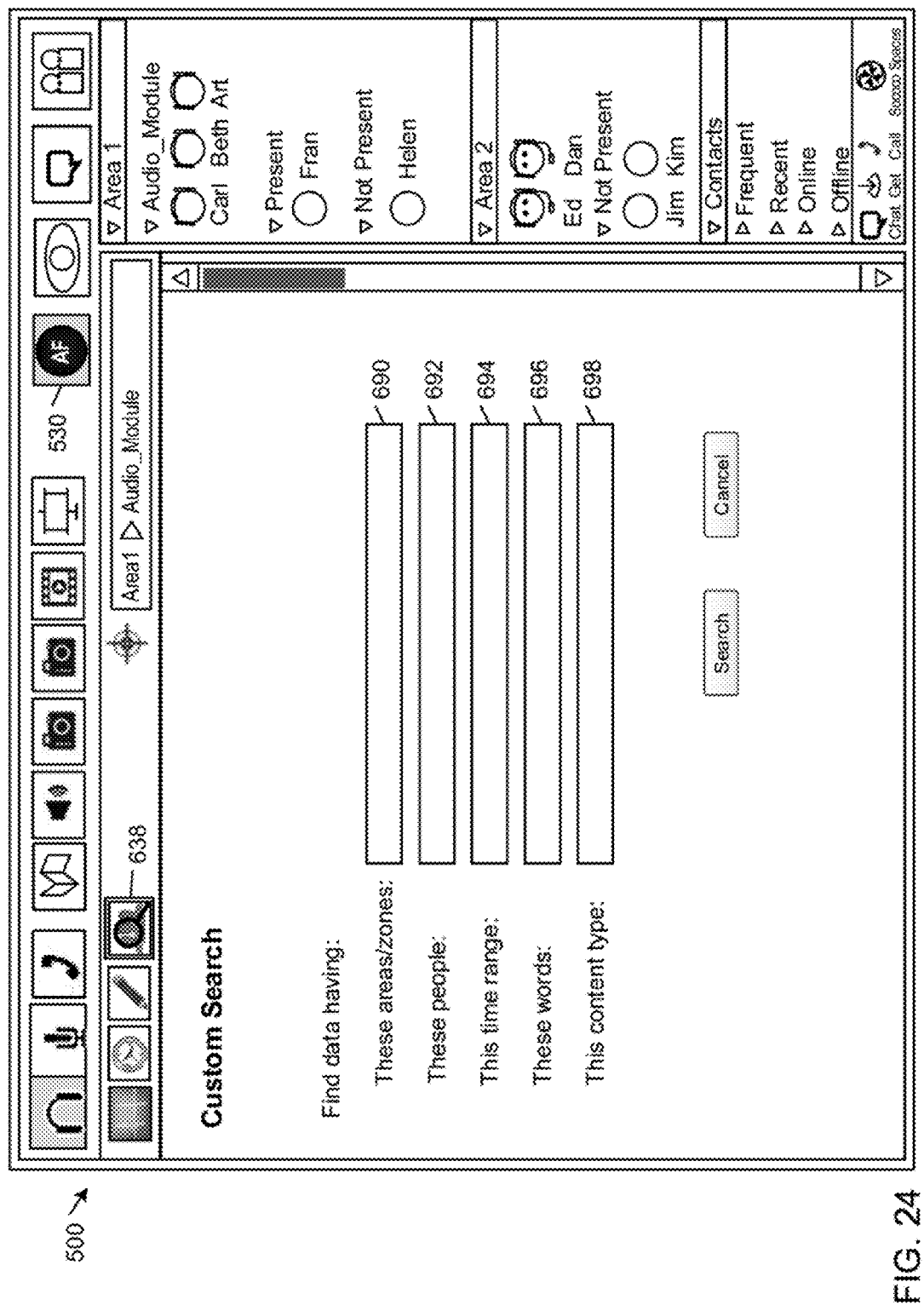
FIG. 24 is a diagrammatic view of an example of a graphical user interface.

FIG. 24 shows an example of a search interface that the browser component 428 generates in the viewer panel of the graphical user interface 500 in response to the user activation of the search control 638. In general, the virtual area platform 18 is able to search on any data associated with the meeting objects. In the example shown in FIG. 24, the search interface includes respective text boxes 690, 692, 694, 696, 698 in which the user can enter criteria for filtering assemblies by place (e.g., by virtual area, and zone), participants (e.g., e.g., communicant names or roles), time, keywords (e.g., text appearing in notes, follow-ups, and chat logs), and content type (e.g., audio, video, chat, and screen share).

Figure 25A:
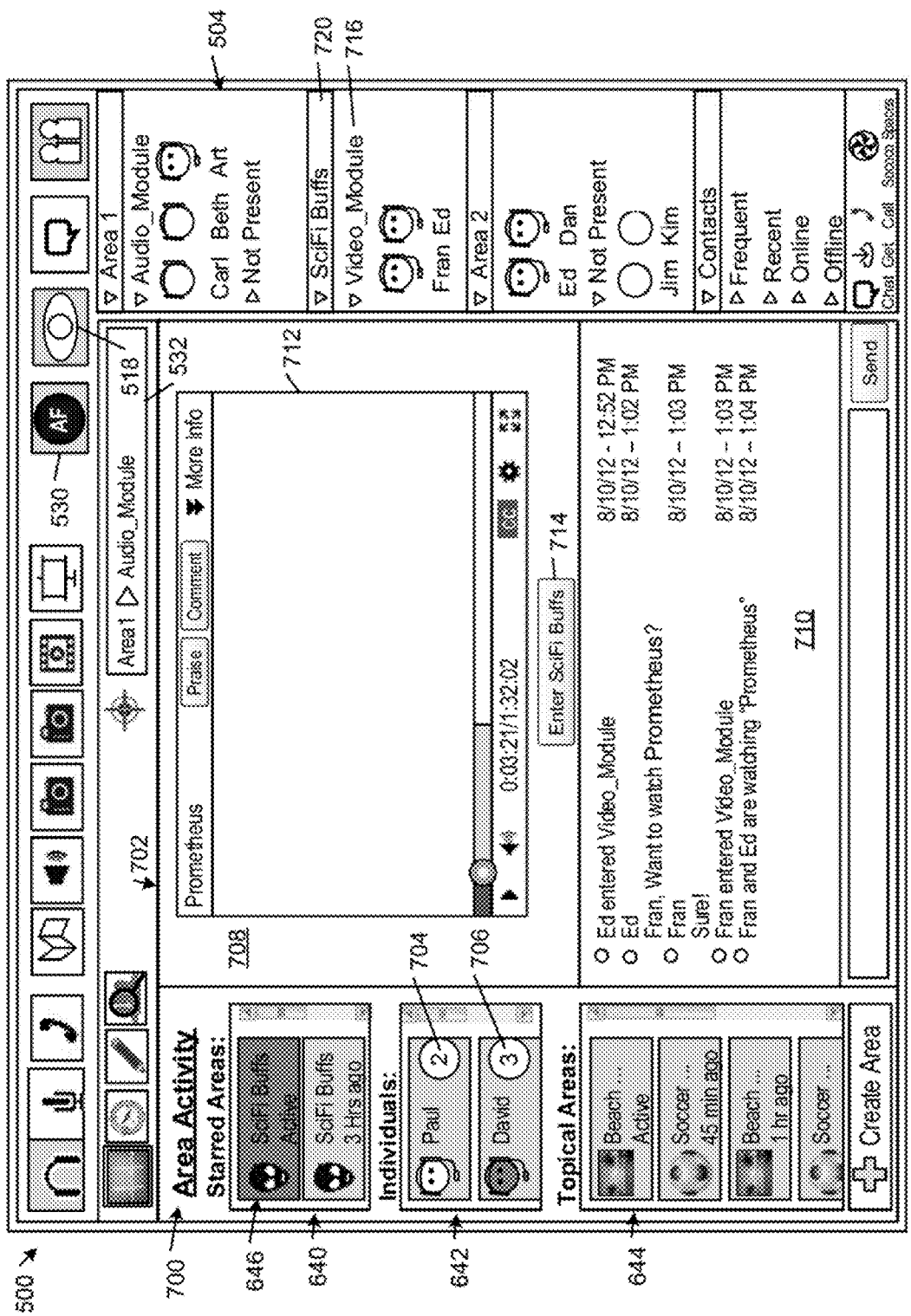
FIGS. 25A-25B are diagrammatic views of an example of a graphical user interface.

FIG. 25A shows an example of the graphical user interface 500 after the user has selected the viewer panel button 530 and the SciFi Buffs area activity summary 646 shown in FIG. 22A. The browser component 428 transmits the user's selection of the viewer panel button 530 to the virtual area platform 18, which returns an updated version of the graphical user interface 500 that includes a side pane 700 that contains the area activity interface and a center pane 702 that contains a visualization of the current realtime activity in the virtual area/zone that is the subject of the selected area activity summary 646 and the chat interface.

The side pane 700 shows a condensed view of the area activity summaries 646. In the illustrated example, instead of listing each of the area activities summaries for each of the contacts included in the Individuals section 642, the area activity summaries are grouped by individual and each group is labeled with a respective indication 704, 706 of the number of area activity summaries in the group. In other examples, the area activity summaries in the Starred Areas section and the Topical Areas section also are grouped by virtual area in order to further condense the view of the area activity summaries.

The center pane 702 includes a main stage section 708 and a chat section 710. The main stage section 708 of the center pane 702 shows an interface 712 for the particular activity that is the subject of the selected area activity summary 646. In the illustrated example, the interface 712 corresponds to a video playback module for rendering the streaming video (i.e., "Prometheus") that is being co-consumed by the user's contacts (i.e., Fran and Ed) who are present in the Video_Module zone of the SciFi Buffs virtual area. The chat section 710 of the center pane 702 shows the chat interface that presents the chat history for the SciFi Buffs virtual area and controls for sending chat messages to the other communicants in the SciFi Buffs virtual area.

As indicated in the people panel 504 and in the location bar 532, the user (i.e., Art) has not entered the SciFi Buffs virtual area as a result of the selection of the area activity summary 646. Instead, the user's presence remains in its current location, namely the Audio_Module of Area 1. However, by selecting the area activity summary 646, the user is able to lurk in the area/zone (i.e., the Video_Module zone of the SciFi Buffs virtual area) that is the subject of the selected area activity summary 646. In this example, only a single communicant (referred to as a "moderator") who is present in the Video_Module zone can control playback of the streaming video content at a time; the user can only passively participate in the co-consumption of the streaming video content that is controlled by the moderator. In this way, the user is able to experience the content that is being co-consumed by the contacts in the subject area/zone and view the chat history for that area/zone. Based on this realtime information, the user readily can determine whether or not to participate in the co-consumption of the content or otherwise interact with his contacts in the subject area/zone. By selecting different area activity summaries in the side pane 700, the user can quickly toggle between different contexts before deciding whether or not to establish a presence in a different virtual location.

The user can enter the Video_Module of the SciFi Buffs virtual area by selecting the Enter SciFi Buffs control 714 or by selecting the label 716 for the Video_Module capsule 718 of the SciFi Buffs section 720 of the people panel 504.

Figure 25B:
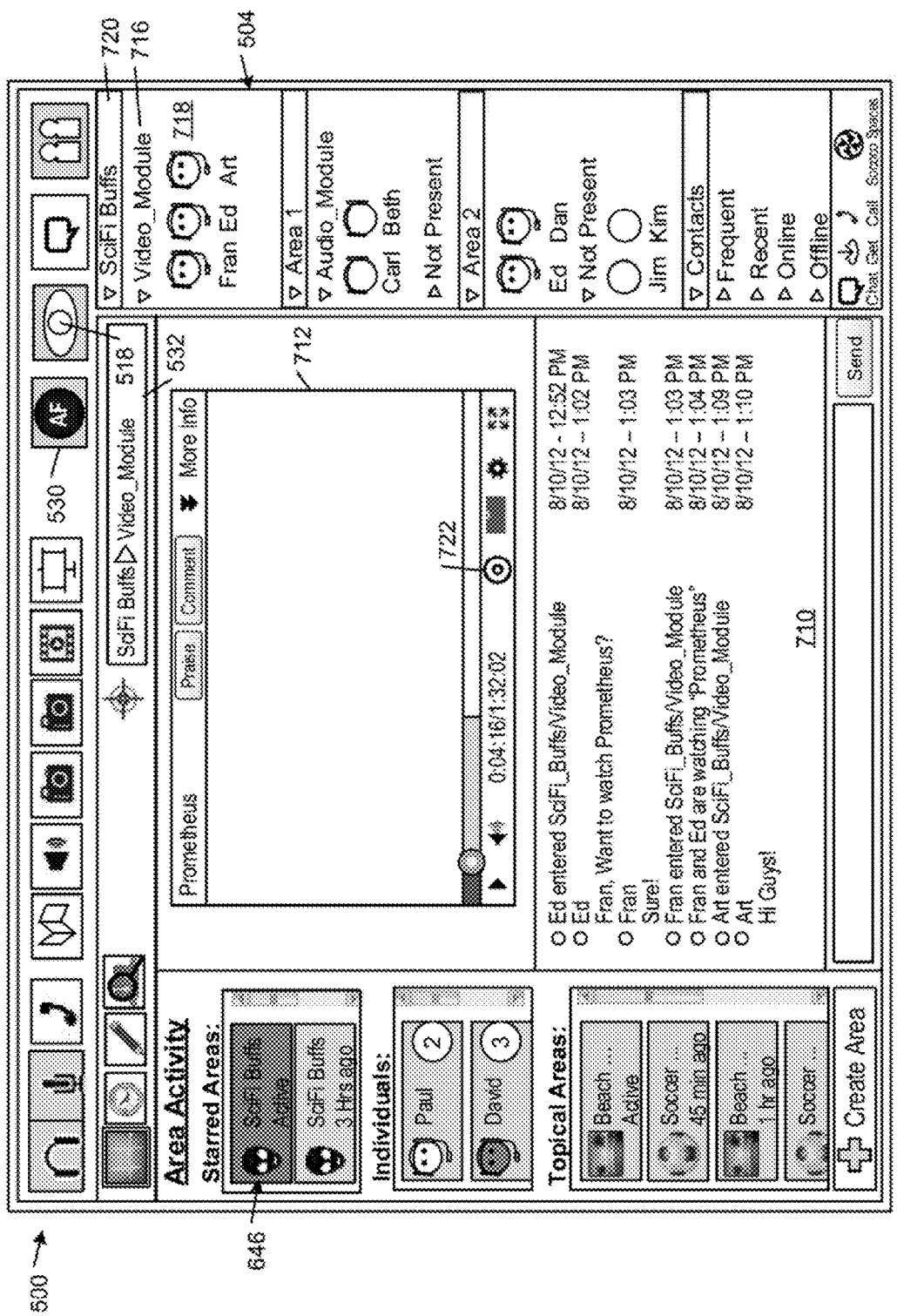

FIG. 25B shows an example of the graphical user interface 500 after the user has entered the Video_Module zone of the SciFi Buffs virtual area. The user's changed location of presence is reflected the people panel 504 which shows the user (Art) in the Video_Module capsule 718 of the SciFi Buffs section 720, and in the location bar 532 which shows the user's current location in SciFi Buffs/Video_Module. In addition to watching the streaming video being controlled by the moderator, the user now can actively participate in the co-consumption of the streaming video content presented in the display area of the video playback module 712 by selecting a "take control" button 722, which causes control the video playback functionality to be transferred from the current moderator to the user (who becomes the new moderator). The user also can communicate with the other communicants who are in the Video_Module zone via voice and chat.

In some examples, the Sococo Spaces application 438 (FIG. 7B) delivers one or more user interfaces that enable a user to specify one or more properties of an area object (e.g., an area label), specify which types of area activity data should be recorded by the server node 430 and associated with the area object, and enter notes, follow-up tasks, comments, praise, and other feedback.

Figure 26:
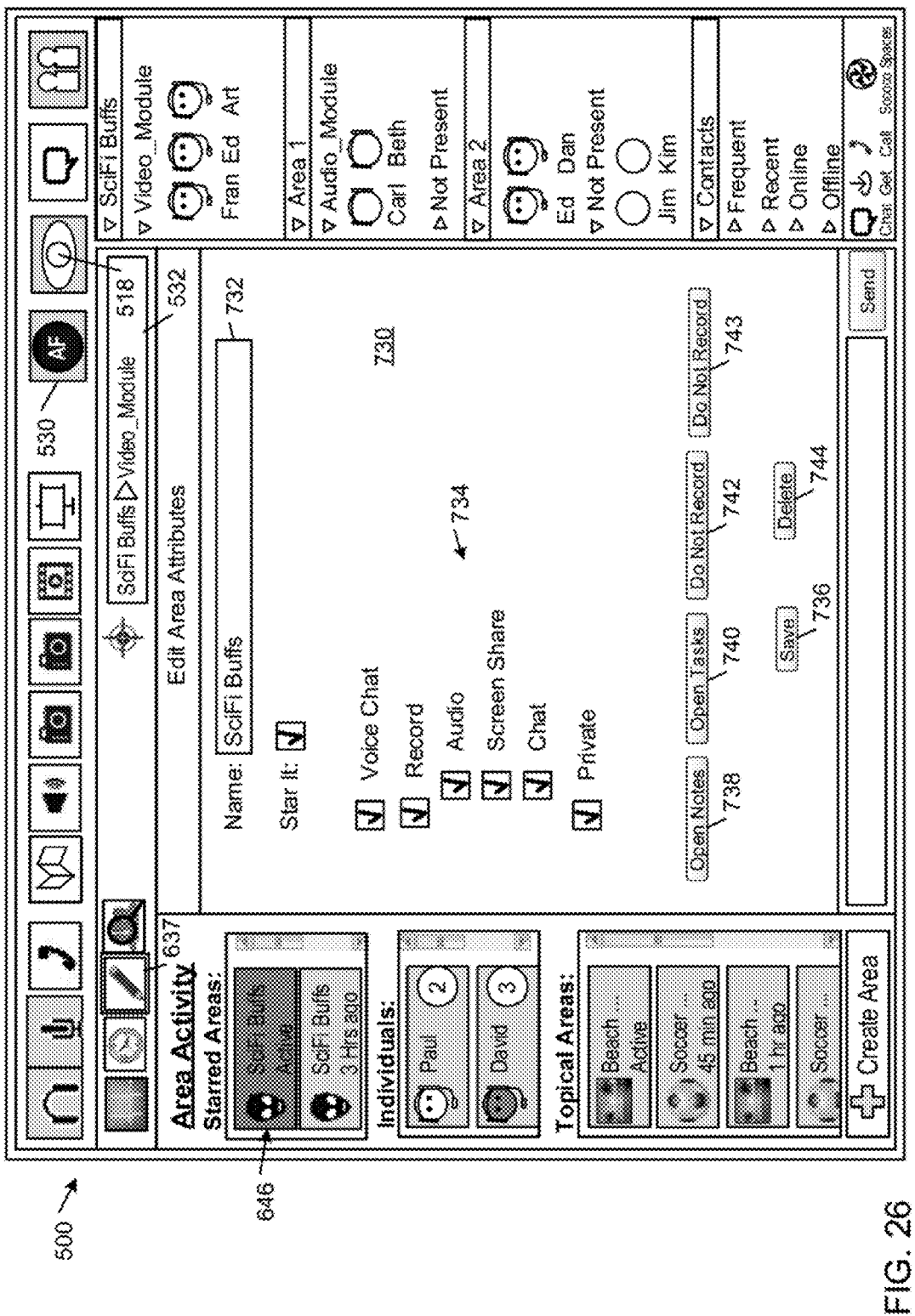
FIG. 26 is a diagrammatic view of an example of a graphical user interface.

FIG. 26 shows the graphical user interface 500 after the user has selected the area edit control 637, which directs the browser component 428 to bring up in the viewer panel an area edit interface 730 that allows the user (assuming the user's has the required capability) to edit one or more attributes of a virtual area (e.g., a virtual area linked to a selected one of the area activity summaries, or a virtual area in which the user is present). The area edit interface 730 includes a Name input box 732 for specifying a name (e.g., "SciFi Buffs") for the virtual area, various check boxes 734 for adding voice chat to the default text chat functionality that is associated with each new virtual area, for specifying which types of area activity data (e.g., audio data, screen share data, and chat data) should be recorded by the server node 430 and associated with the associated area object, and for specifying that the virtual area should be managed as a private virtual area instead of being managed as a public virtual area by default. The area edit interface 730 also includes a control 736 for saving the specified area properties, a control 738 for opening a notes interface, a control 740 for opening a tasks interface, a control 742 for stopping the recording of data associated with the virtual area or the user's current zone of presence in the virtual area, a control 743 for adding a zone to the virtual area, and a control 744 for deleting the virtual area.

In some examples, the browser component 428 automatically brings up the area edit interface 730 without requiring the user to activate the area edit control 637. In one example, upon receiving an area creation request from a user in connection with context data (e.g., one or more of content, people, and location data), the server node 430 creates an area object for a new virtual area and sends a notification and the unique identifier for the new area object to the communications application 426 running on the user's client node. The communications application 426 passes the unique identifier of the area object to the browser component 428, which retrieves the Sococo Spaces application user interface specification and application logic from the web server 434 and renders the area edit interface 730 in the viewer panel.

Figure 27:
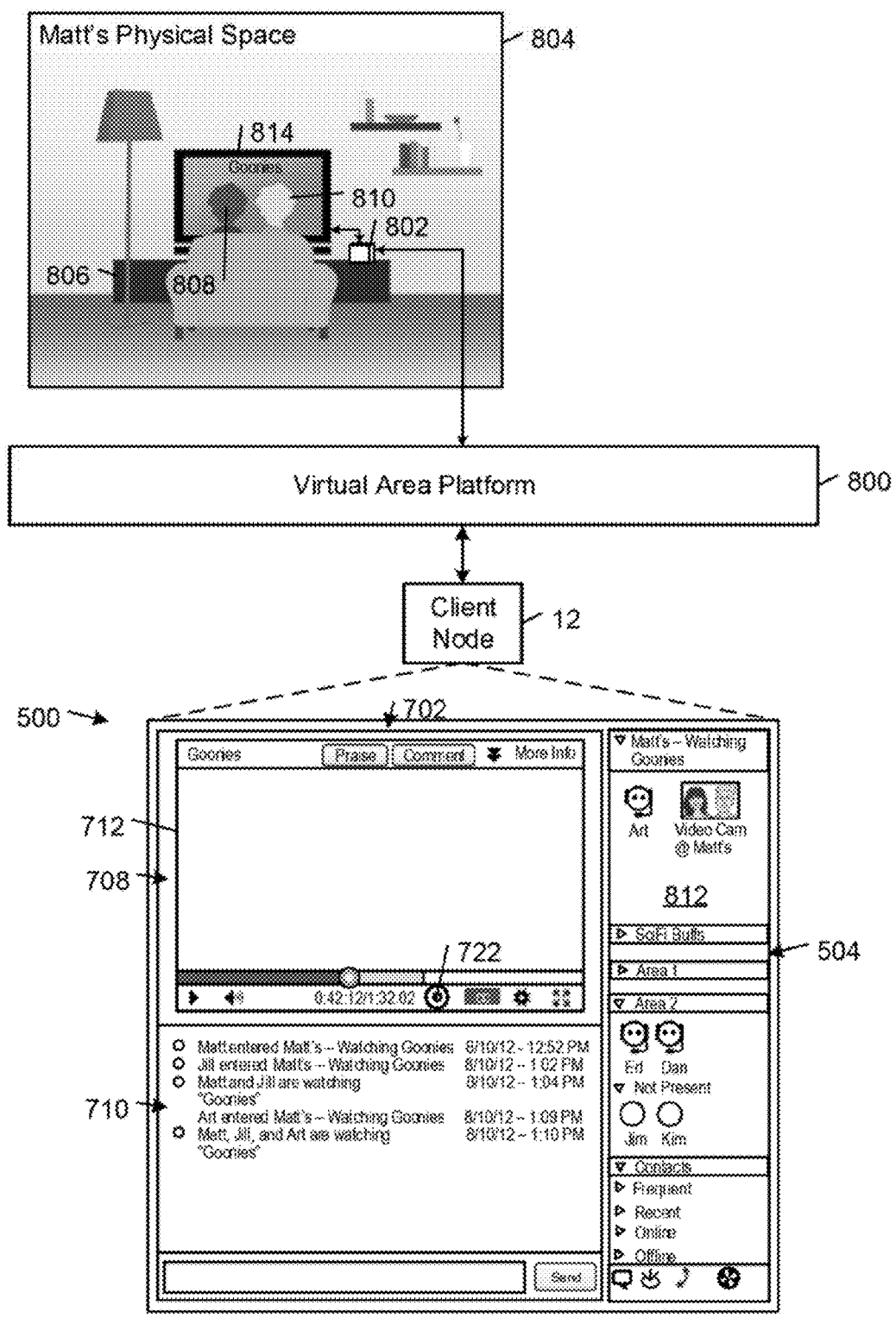
FIG. 27 is a diagrammatic view of an example of a network communications environment.

FIG. 27 shows an example 800 of the virtual area platform 18 connected to a virtual presence apparatus 802 in a real-world physical space 804 (Matt's) and the user's client network node 12. In the illustrated example, the virtual presence apparatus 802 is positioned on a stand 806 in a real-world living room containing two communicants 808, 810.

The virtual presence apparatus 802 typically includes software and hardware resources that enable the virtual presence apparatus 802 to connect to the virtual area platform 802 and the client network node 12, either directly (e.g., peer-to-peer) or through a hosted network connection. In some examples, the virtual presence apparatus 802 or a network node hosting the virtual presence apparatus includes a complete or modified version of the communications application 26, which provides functions for communicating with the virtual area platform 800 and establishing network connections and communicating realtime data streams with client network nodes. When connected to the virtual area platform 800, the virtual presence apparatus 802 can be registered in association with and/or logged into the one or more virtual areas. The registration data typically includes the globally unique identifier of the virtual presence apparatus 802 and configuration data. The configuration data may include, for example, a device type identifier, an indication whether the virtual presence apparatus 802 should be associated with an existing virtual area or a new virtual area, one or more conditions on the availability of the associated virtual area (e.g., the associated virtual area is accessible to communicants conditioned on the virtual area apparatus 802 being present in or logged into the virtual area), a specification of the source and sink capabilities of the virtual presence apparatus 802, a specification of a graphical representation of the virtual presence apparatus 802, and identification of communicants who automatically should be designated as members of virtual areas in which the virtual presence equipment is present. When logged into a virtual area, the virtual presence apparatus 802 transduces human perceptible stimulus (e.g., audio, visual, mechanical, and other sensory stimulus) between the client network nodes of communicants who are present in the virtual area and the physical space 804. In this way, the virtual presence apparatus 802 bridges a physical experience of the physical space 804 to communicants in the one or more virtual areas (i.e., communicants who are present in the virtual areas) and bridges communicant interactions in the one or more virtual areas to communicants in the physical space 804. Exemplary virtual presence apparatus are described in U.S. application Ser. No. 13/554,051, filed Jul. 20, 2012, and U.S. application Ser. No. 13/554,084, filed Jul. 20, 2012.

The virtual presence apparatus 802 is a virtual area enabled device that integrates a speakerphone and a video camera. The speakerphone includes a microphone that converts human voice sounds projected into the physical space 804 by the communicants 808, 810 into output voice data that is transmitted to the client network nodes of the communicants who are present in a particular virtual area, and a speaker that projects human voice sounds received from the client network nodes into the physical space 804. The video camera captures images of a scene in the physical space 804 (e.g., images of the communicants 808, 810) and converts the captured images into output image data that is transmitted to the client network nodes of communicants who are present in the particular virtual area.

The virtual area platform 800 typically creates a new virtual area in response to a determination that one or more specified predicates on the state of the physical space 804 are satisfied. Examples of such predicates include: a person has entered the physical space 804; at least two persons have entered the physical space 804; a threshold time period (e.g., one or more persons have been in the physical space 804 for at least three minutes); and the television 814 has been turned on.

In some examples, the virtual presence apparatus 802 includes functionality (e.g., image-based motion and face detection technologies) for determining when one or more persons have entered the physical space 804, determining the identities of those persons, determining when the television 814 has been turned on, and reporting such information to the virtual area platform 800.

In other examples, the virtual area platform 800 performs the person detection and identified processes. In some examples, the virtual area platform 800 receives location data (e.g., Global Positioning System (GPS) data) that is associated with the communicants 808, 810 (e.g., by a GPS component of a mobile device, such as a mobile phone or other mobile communication device), and determines that the communicants are in Matt's physical space 804 based on comparison of the received location data with location data associated with the physical space. In some examples, the virtual area platform 800 receives audio data from the speakerphone component of the virtual presence apparatus 802, and associates the audio data with a communicant in the physical space based on comparison of the audio data with one or more voice data records associated with the communicant. The voice records typically correspond to voiceprints (also referred to as voice templates or voice models) that are created from features that are extracted from the recorded speech of known communicants in accordance with a speaker recognition enrollment process. Each voiceprint is associated with the identity of a particular communicant. The virtual area platform 800 associates the audio data with the communicant in response to a determination that features extracted from the audio data correspond to the voiceprint previously associated with the communicant. In this way, the virtual area platform 800 can automatically identify communicants who are in the physical space without requiring them to login through respective client network nodes. Once a particular communicant in the physical space 804 has been identified, the virtual area platform 800 can automatically establish a presence for that communicant in the virtual area associated with the virtual presence apparatus 802 and track utterances from that communicant in the audio data captured by the virtual presence apparatus 802 such that visual cues indicative of the state of that communicant's voice (e.g., speaking or silent) can be presented in the spatial visualization of the virtual area that is displayed to the remote communicant on the remote client network node 12.

After the virtual area platform 800 has determined that a specified physical space state predicate has been satisfied, the virtual area platform 800 instantiates a new virtual area. The new virtual area typically is associated with a name (e.g., a base name obtained from the registration data associated with the virtual presence apparatus 802 together with a contextual name indicative of the context that triggered the creation of the virtual area—e.g., "Matt's—Watching Goonies").

The virtual area platform 800 also establishes a presence in the virtual area for the virtual presence apparatus 802, and publishes area activity summaries describing activity in the virtual area to communicants (e.g., all members of the virtual area platform service, only the designated members of the virtual area, or only the designated members and those communicants who have a social network tie to the designated members). The area activity summaries include links that allow communicants to navigate to the virtual area. In response to a request from a communicant to navigate to the virtual area, the virtual area platform 800 sends provisioning instructions for establishing respective sessions between the virtual presence apparatus 802 and the client network node of the communicant and for displaying a graphical representation of the virtual area.

FIG. 27 shows an example of the graphical user interface 500 after the user (Art) has selected the published area activity summary for the newly created virtual area "Matt's—Watching Goonies." The main stage section 708 of the graphical user interface 500 shows a visualization of the current realtime activity in the physical space 802 and the chat section 710 of the graphical user interface 500 shows a log of events associated with the virtual area. In the illustrated example, Matt and Jill area watching the movie "Goonies" on the television 814. The movie is being streamed from a network video streaming service (e.g., the Netflix® streaming media service) through an intermediate node of the virtual area platform 800 (e.g., an intermediate network node of the type described in U.S. Provisional Application No. 61/597,757, filed Feb. 11, 2012) that is integrated (e.g., through respective video streaming plugins) with the network video streaming service, the television 814, and the client network node 12. In this way, the user can watch the streaming video being controlled by a moderator in the physical space 804. In addition, the user can actively participate in the co-consumption of the streaming video content presented in the display area of the video playback module 712 by selecting the "take control" button 722, which causes control the video playback functionality to be transferred from the current moderator to the user (who becomes the new moderator). The user also can communicate with the communicants 808, 810 who are in the physical space via voice through the virtual presence apparatus 802.

III. Conclusion

Other embodiments are within the scope of the claims.

The invention claimed is:

1. A method in a network communications environment comprising a network service implemented by one or more server network nodes and supporting realtime communications between client network nodes of ones of a user and one or more other communicants in virtual areas that define respective communication contexts in the network communications environment, the method comprising by the network service:

in connection with a graphical user interface presented on the client network node of the user, receiving from the client network node of the user a request to associate a content item with a new virtual area;

based on the request, creating a new virtual area and associating the content item with the new virtual area; and administering one or more of the supported realtime communications between the client network nodes of respective ones of the communicants who are co-present in the new virtual area in connection with the content item, wherein the administering comprises enabling the client network nodes of the co-present ones of the communicants to jointly share the content item.

2. The method of claim 1, wherein the request is received from a browser component of the client network node of the user based on input by the user in connection with an interface control associated with the network service and indicating selection of a content item in a document being displayed in the graphical user interface.

3. The method of claim 2, further comprising receiving from the browser component of the client network node of the user a uniform resource identifier of the document.

4. The method of claim 3, further comprising:

based on the uniform resource identifier of the document, automatically ascertaining content items of one or more particular content types that are associated with the document; and transmitting, to the client network node of the user, instructions for presenting user-selectable graphical representations of the ascertained content items in the graphical user interface.

5. The method of claim 4, further comprising:

generating a second document comprising the user-selectable graphical representations of respective ones of the ascertained content items;

serving the second document to the client network node of the user for display by the browser component in the graphical user interface; and from the client network node of the user, receiving a uniform resource identifier of the selected content item corresponding to one of the ascertained content items that is selected by the user.

6. The method of claim 1, wherein the request is received from a browser component of the client network node of the user in response to selection of an interface control associated with the network service by the user while the document browser component is rendering a document comprising a graphical representation of the content item.

7. The method of claim 1, further comprising: after the creating, sending the client network node a link to the new virtual area; and establishing a presence of the user in the new virtual area based on a request received in connection with a selection of the link by the user.

8. The method of claim 1, wherein the content item comprises image-based content.

9. The method of claim 1, wherein the content item comprises audio content.

10. The method of claim 1, wherein the content item comprises text-based conversation content.

11. The method of claim 1, further comprising: in connection with the graphical user interface, receiving a name of the new virtual area from the client network node of the user; and associating the name with the new virtual area.

12. The method of claim 1, wherein the virtual area is associated with a graphical user interface for rendering the content item on the client network nodes of the communicants who are present in the virtual area, and at least one mode of realtime communication that is supported by the client network nodes of co-present ones of the communicants in the virtual area.

13. A method in a network communications environment comprising a network service implemented by one or more server network nodes and supporting realtime communications between client network nodes of ones of a user and one or more other communicants in virtual areas that define respective communication contexts in the network communications environment, the method comprising by the network service:

in connection with a graphical user interface presented on the client network node of the user, receiving from the client network node of the user a request to associate a content item with a virtual area, responsive to the request sending to the client network node of the user a list of one or more existing virtual areas, and receiving from the client network node of the user an indication of a selected one of the existing virtual areas in the list;

based on the request and the indication of the selected existing virtual area, associating the content item with the selected existing virtual area; and administering one or more of the supported realtime communications between the client network nodes of respective ones of the communicants who are co-present in the selected existing virtual area in connection with the content item, wherein the administering comprises enabling the client network nodes of the co-present ones of the communicants to jointly share the content item.

14. The method of claim 13, further comprising, based on the request, sending the user a link to establish a presence of the user in the selected existing virtual area.

15. The method of claim 13, wherein the request is received from a browser component of the client network node of the user based on input of the user in connection with an interface control associated with the network service without the user being present in the virtual area.

16. The method of claim 13, further comprising receiving from the client network node of the user a uniform resource identifier of the document.

17. The method of claim 16, further comprising:
based on the uniform resource identifier of the document, automatically ascertaining content items of one or more particular content types that are associated with the document; and
transmitting, to the client network node of the user, instructions for presenting user-selectable graphical representations of the ascertained content items in the graphical user interface.

18. The method of claim 13, further comprising receiving from the client network node of the user a text-based note to associate with the content item, associating the note with the content item, and in graphical user interfaces displayed on the client network nodes of the ones of the communicants who are present in the new virtual area presenting a graphical representation of the content item in association with the note.

19. A method in a network communications environment comprising a network service implemented by one or more server network nodes and supporting realtime communications between client network nodes of ones of a user and one or more other communicants in virtual areas that define respective communication contexts in the network communications environment, the method comprising by the client network node of the user:

presenting a graphical user interface comprising an interface element and displaying a document comprising a graphical representation of a content item;

receiving input by the user selecting the graphical representation of the content item in the graphical user interface;

based on user input in connection with the interface element, sending to the network service a request to create a new virtual area and to associate the selected content item with the new virtual area;

sending to the network service a request to establish a presence of the user in the new virtual area;

responsive to the request, receiving from the network service instructions to display a graphical representation of the new virtual area and an interface for rendering the content item on the client network node of the user; and responsive to instructions received from the network service, establishing one or more of the supported realtime communications with the client network node of a respective one of the other communicants who is co-present with the user in the virtual area and jointly sharing the content item.

20. The method of claim 19, further comprising, by the client network node of the user, transmitting to the network service a uniform resource identifier of the document.

* * * * *